US008244392B2

(12) United States Patent
Koskovich et al.

(10) Patent No.: US 8,244,392 B2
(45) Date of Patent: Aug. 14, 2012

(54) AUTOMATED TRUSS ASSEMBLY JIG SETTING SYSTEM

(75) Inventors: Jerome E. Koskovich, Byron, MN (US); John Fingerson, Rochester, MN (US)

(73) Assignee: MiTek Holdings, Inc., Wilmington, DE (US)

( * ) Notice: Subject to any disclaimer, the term of this patent is extended or adjusted under 35 U.S.C. 154(b) by 835 days.

(21) Appl. No.: 12/200,312

(22) Filed: Aug. 28, 2008

(65) Prior Publication Data

US 2009/0084468 A1 Apr. 2, 2009

Related U.S. Application Data

(60) Provisional application No. 60/976,233, filed on Sep. 28, 2007.

(51) Int. Cl.
*G06F 19/00* (2006.01)
*B25B 1/20* (2006.01)

(52) U.S. Cl. ..... 700/114; 269/910; 29/281.3; 29/897.31

(58) Field of Classification Search .................... 700/97, 700/98, 114, 167, 225; 269/37, 303, 910; 29/42, 464, 897.31; 144/345
See application file for complete search history.

(56) References Cited

U.S. PATENT DOCUMENTS

| | | | | |
|---|---|---|---|---|
| 4,524,960 | A | 6/1985 | LePoire | |
| 4,679,781 | A | 7/1987 | LePoire | |
| 5,092,028 | A | 3/1992 | Harnden | |
| 5,430,662 | A * | 7/1995 | Ahonen | 700/97 |
| 5,702,095 | A * | 12/1997 | Williams | 269/37 |
| 5,810,341 | A * | 9/1998 | Williams | 269/37 |
| 5,833,222 | A | 11/1998 | Olden | |
| 5,837,014 | A * | 11/1998 | Williams | 269/910 |
| 5,854,747 | A | 12/1998 | Fairlie | |
| 5,873,567 | A * | 2/1999 | Williams | 269/37 |
| 5,947,460 | A * | 9/1999 | Williams | 269/37 |
| 6,170,163 | B1 * | 1/2001 | Bordignon et al. | 269/37 |
| 6,205,637 | B1 * | 3/2001 | Williams | 29/897.31 |
| 6,317,980 | B2 * | 11/2001 | Buck, III | 29/897.31 |
| 6,702,269 | B1 * | 3/2004 | Tadich | 269/37 |
| 6,712,347 | B1 | 3/2004 | Fredrickson | |
| 6,976,305 | B2 | 12/2005 | Kanjee | |
| 6,978,987 | B2 | 12/2005 | Kanjee | |
| 7,021,614 | B2 * | 4/2006 | Hubbard | 269/37 |
| 7,093,350 | B2 | 8/2006 | McNeelege | |
| 7,093,829 | B2 | 8/2006 | Fredrickson | |
| 7,140,100 | B2 | 11/2006 | Kanjee | |

(Continued)

FOREIGN PATENT DOCUMENTS

AU 680638 B2 8/1997

(Continued)

OTHER PUBLICATIONS

European Search Report dated Feb. 2, 2009, 7 pages.

(Continued)

*Primary Examiner* — Charles Kasenge
(74) *Attorney, Agent, or Firm* — Senniger Powers LLP

(57) ABSTRACT

A method of automatically placing pucks on a truss assembly table includes the steps of receiving input regarding the truss assembly table and a truss to be assembled on the truss assembly table, and processing the input. Locations on the truss assembly table for each puck are selected based on the processed input that optimizes the overall support given to the truss. The pucks are automatically moved to their selected locations.

24 Claims, 30 Drawing Sheets

U.S. PATENT DOCUMENTS

| | | | | |
|---|---|---|---|---|
| 7,621,053 | B2 * | 11/2009 | Bianchin | 269/37 |
| 2001/0015015 | A1 * | 8/2001 | Buck, III | 29/897.31 |
| 2004/0119219 | A1 * | 6/2004 | Hubbard | 269/37 |
| 2006/0071383 | A1 * | 4/2006 | Rupe et al. | 269/37 |
| 2007/0133216 | A1 * | 6/2007 | Wood | 362/458 |
| 2007/0283546 | A1 | 12/2007 | Koskovich | |
| 2008/0012190 | A1 | 1/2008 | Koskovich | |
| 2008/0084014 | A1 | 4/2008 | Godwin | |
| 2008/0250657 | A1 * | 10/2008 | Bianchin | 33/16 |
| 2008/0313994 | A1 * | 12/2008 | Nuutinen | 52/745.19 |

FOREIGN PATENT DOCUMENTS

| | | | |
|---|---|---|---|
| EP | 1864769 | A1 | 12/2007 |
| WO | 0059695 | | 1/2002 |
| WO | 2004074600 | A2 | 11/2005 |

OTHER PUBLICATIONS

Charter Gold Advertiser & BCMC Exhibitor, Nov. 2007, p. 9.

Search report dated Apr. 29, 2009 regarding Application No. GB0817580.4, 6 pages.

* cited by examiner

AUTOMATED TRUSS ASSEMBLY JIG SETTING SYSTEM

FIELD OF THE INVENTION

The present invention relates generally to assembling trusses and more particularly to an automated truss assembly jig setting system.

BACKGROUND OF THE INVENTION

Prefabricated trusses are often used in the construction of buildings because of their strength, reliability, low cost, and ease of use. An increase in the use of more complex and varied trusses, however, has created manufacturing problems and increased production times.

Trusses are generally assembled on a jigging table. Jigging tables typically have a plurality of adjustable stops, or pucks, for indicating the proper positions of the elements of a truss and for holding these elements in position until they can be permanently secured together. The pucks must be repositioned on the jig surface for each different truss. Computer programs generally calculate the position of the pucks from a reference line, such as the edge of the table. Conventionally, an operator would measure the positions of the pucks from the reference line, manually move and secure the pucks into the desired positions, place the truss elements on the table against the pucks, fasten them together, remove the completed truss, and then repeat. Due to great variation and complexity in modern truss designs, a significant amount of production time is spent resetting the positions of the pucks and there is a high likelihood of operator error. Various approaches have been developed to enhance this process.

One method that has been developed to increase production efficiency in truss assembly is laser projection. This approach projects the image of a desired truss in actual shape and size onto a jig table. The pucks of the jig table are then simply moved to their corresponding locations as indicated by the laser projection. This minimizes or eliminates the measurement time needed with conventional systems and ensures accurate placement of the pucks. Known laser truss assembly systems are disclosed in U.S. Pat. No. 5,430,662 to Ahonen, U.S. Pat. No. 6,317,980 to Buck and U.S. Pat. No. 6,170,163 to Bordignon et al, which are hereby incorporated by reference. However, these types of systems do not eliminate the need to repeatedly secure and loosen the pucks for each truss design. Although effective in increasing the correctness of assembled trusses, the time it takes for an operator to manually position the pucks with their corresponding projected image is significant.

Another approach employs a system that automatically moves the pucks along the surface of the jig. Such systems are disclosed in U.S. Pat. No. 5,854,747 to Fairlie, U.S. Pat. No. 6,712,347 to Fredrickson et al, and U.S. Pat. No. 5,342,030 to Taylor, which are hereby incorporated by reference. The goal of such systems is speed and efficiency greater than prior systems such as manual jig tables and laser projection. For example, the '347 patent criticizes prior laser projection systems as being too slow and expensive. While these systems may speed up the process, they tend to suffer reliability and consistency issues. Because trusses are often made from wood, sawdust and wood chips often pile up on the jigging table. This debris can fall into the slots in which the pucks move, hampering or preventing the pucks from reaching their proper position or preventing the pucks from being properly secured. An operator assembling a truss based on faulty positioning caused by one of these problems may fail to notice when one of the pucks is not in its proper place, possibly leading to an entire batch of improperly aligned trusses. In addition, any error by the software or hardware system controlling the pucks is not likely to be caught by an operator as there is nothing to indicate that there are pucks that are not properly aligned. Moreover, although speed and efficiency can be increased with use of such a system, it often requires a large initial investment to completely replace all existing manual equipment for the automated equipment and a significant prior capital expenditure is wasted in discarding the previously used tables.

In existing systems, whether each individual puck is positioned on the top of the truss, the bottom of the truss, or in the interior of the truss is typically chosen essentially at random or in a pre-determined fashion not dependent on the shape of the particular truss, such as alternating between the top and the bottom. This can lead to truss members not being properly supported during assembly of trusses, which can decrease the efficiency and quality of assembly. Accordingly, it would be desirable to have an automated truss assembly system that positions the pucks on a truss assembly table to provide optimum truss support.

SUMMARY OF THE INVENTION

In one aspect of the present invention, a method of automatically placing pucks on a truss assembly table generally comprises the steps of receiving input regarding the geometry of a truss assembly table and input regarding a truss to be assembled on the truss assembly table and processing the input. The method further includes the steps of selecting locations on the truss assembly table for each puck based on the processed input, and automatically moving the pucks to their selected locations.

In yet another aspect, a truss assembly table generally comprises a table and a plurality of puck assemblies mounted for translational movement on the table. A software system is operatively connected to the table that controls the movement of the puck assemblies. The software system chooses whether each puck assembly should be located on a top side, bottom side, or interior of a truss to be assembled on the table in order to provide optimum support for the truss while it is being assembled.

In another aspect, a method of assembling the components of a truss generally comprises the steps of entering a design of a truss into a computer system that controls the movement of puck assemblies on a truss assembly table, and running a software program on the computer system that chooses whether each puck assembly should be located on a top side, bottom side, or interior of the truss in order to provide optimum support for the truss while it is being assembled and moves each puck assembly to its chosen location. The method further comprises the steps of placing truss members on the truss assembly table according to the puck assembly locations, and assembling the truss members to form a truss.

In yet another embodiment, a truss assembly table generally comprises means to indicate the positioning of truss members, means to effect movement of the means to indicate the positioning of truss members, and means of selecting the location of the means to indicate positioning of truss members to optimize the support given to the truss members as a truss is being assembled from the truss members.

In another embodiment, a method of calibrating location of each rail on a truss assembly table generally comprises the steps of determining a first straight line representing a best fit to a first edge of the truss assembly table, and determining a second straight line on a second edge of the truss assembly table that is perpendicular to the first edge. A first distance is measured from the second straight line to the center of each puck at a known fixed distance from the first straight line near the first edge. A second distance is measured from the second straight line to the center of each puck at a known fixed distance from the first straight line near a third edge of the truss assembly table opposite of the first edge.

BRIEF DESCRIPTION OF THE DRAWINGS

The invention may be more completely understood in consideration of the following detailed description of various embodiments of the invention in connection with the accompanying drawings, in which.

Corresponding reference characters indicate corresponding parts throughout the several views of the drawings.

DETAILED DESCRIPTION OF THE DRAWINGS

Figure 1:
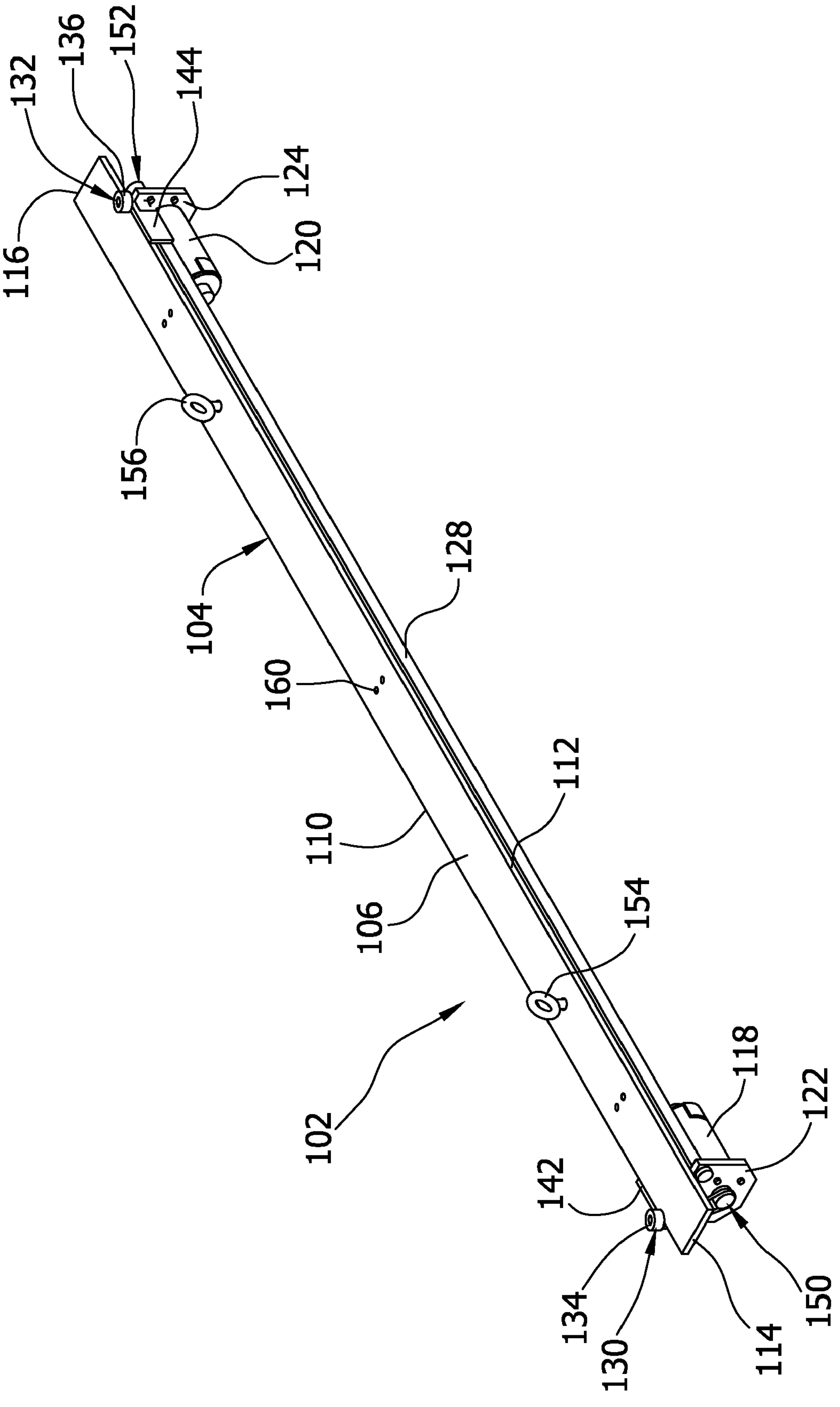
FIG. 1 is a perspective view of a removable plank unit according to an embodiment of the present invention.
Figure 2:
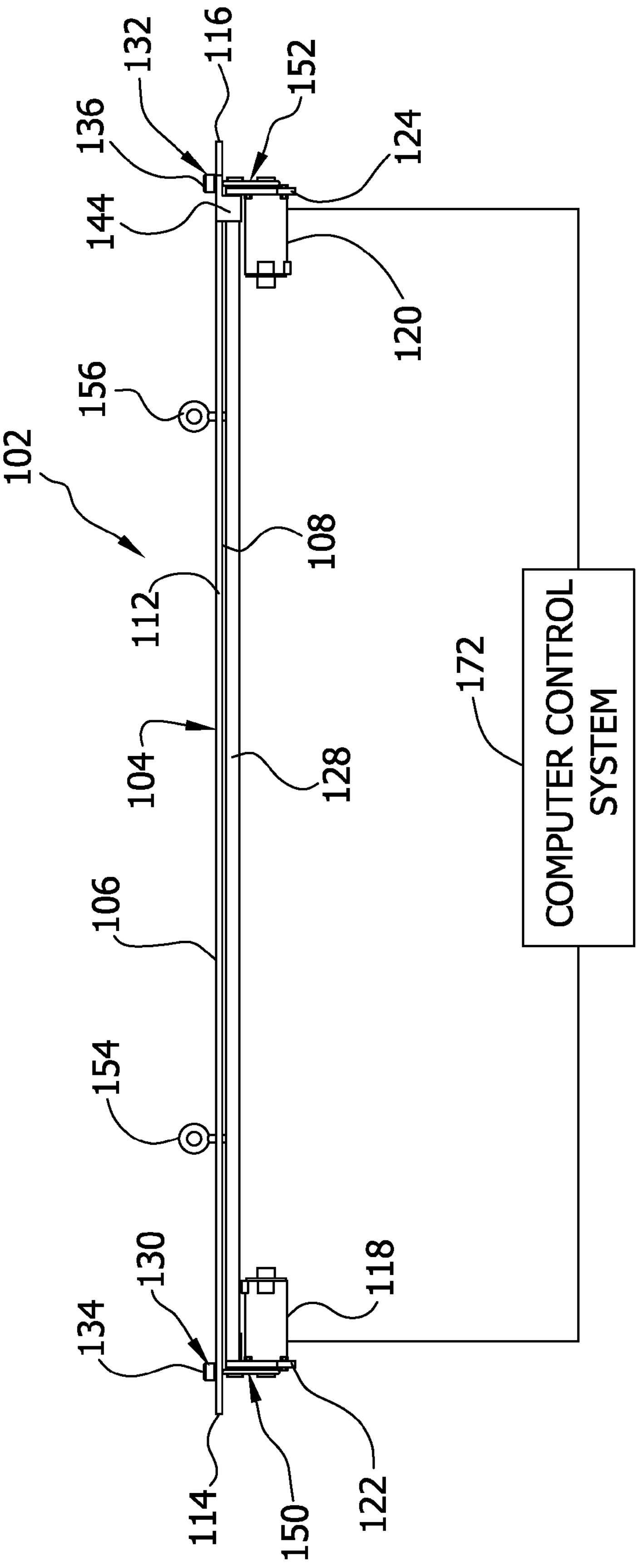
FIG. 2 is a side elevation of the removable plank unit.
Figure 3:
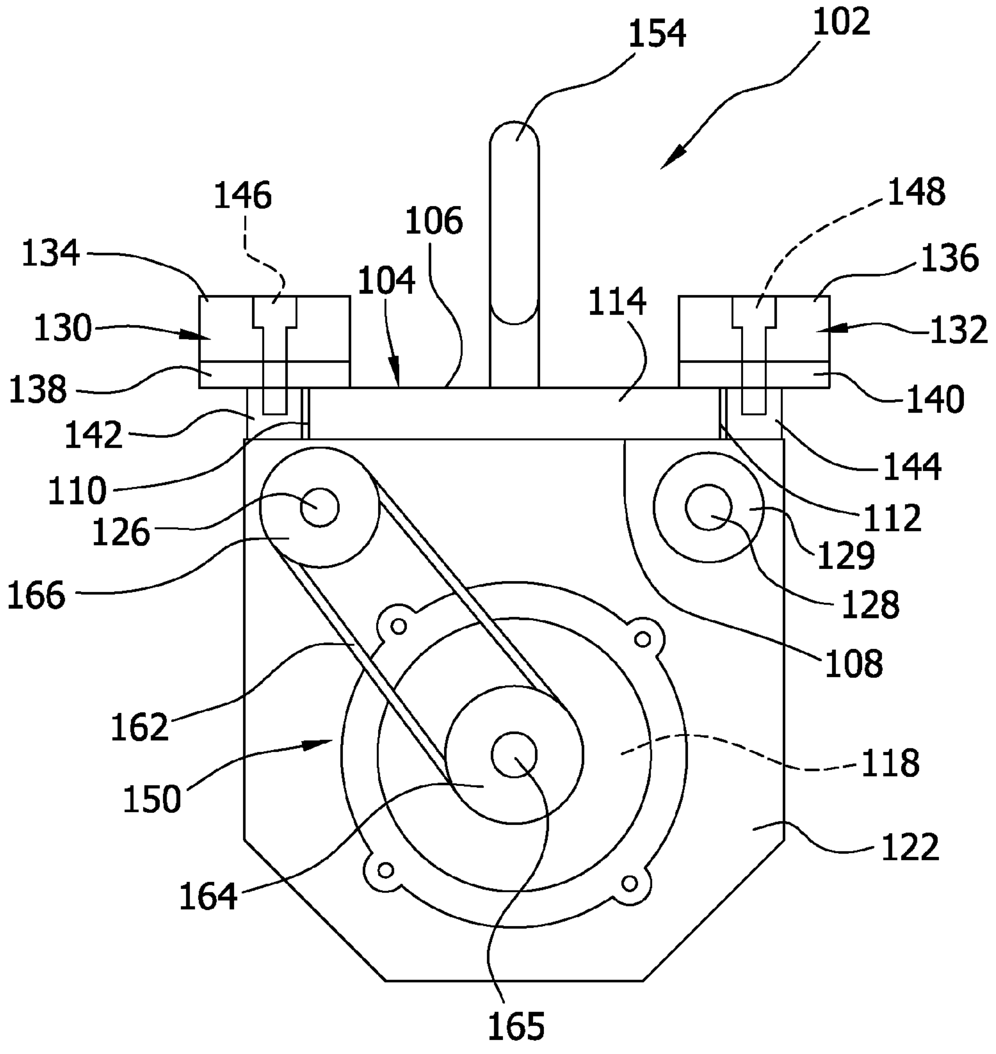
FIG. 3 is a front elevation of the removable plank unit.
Figure 4:
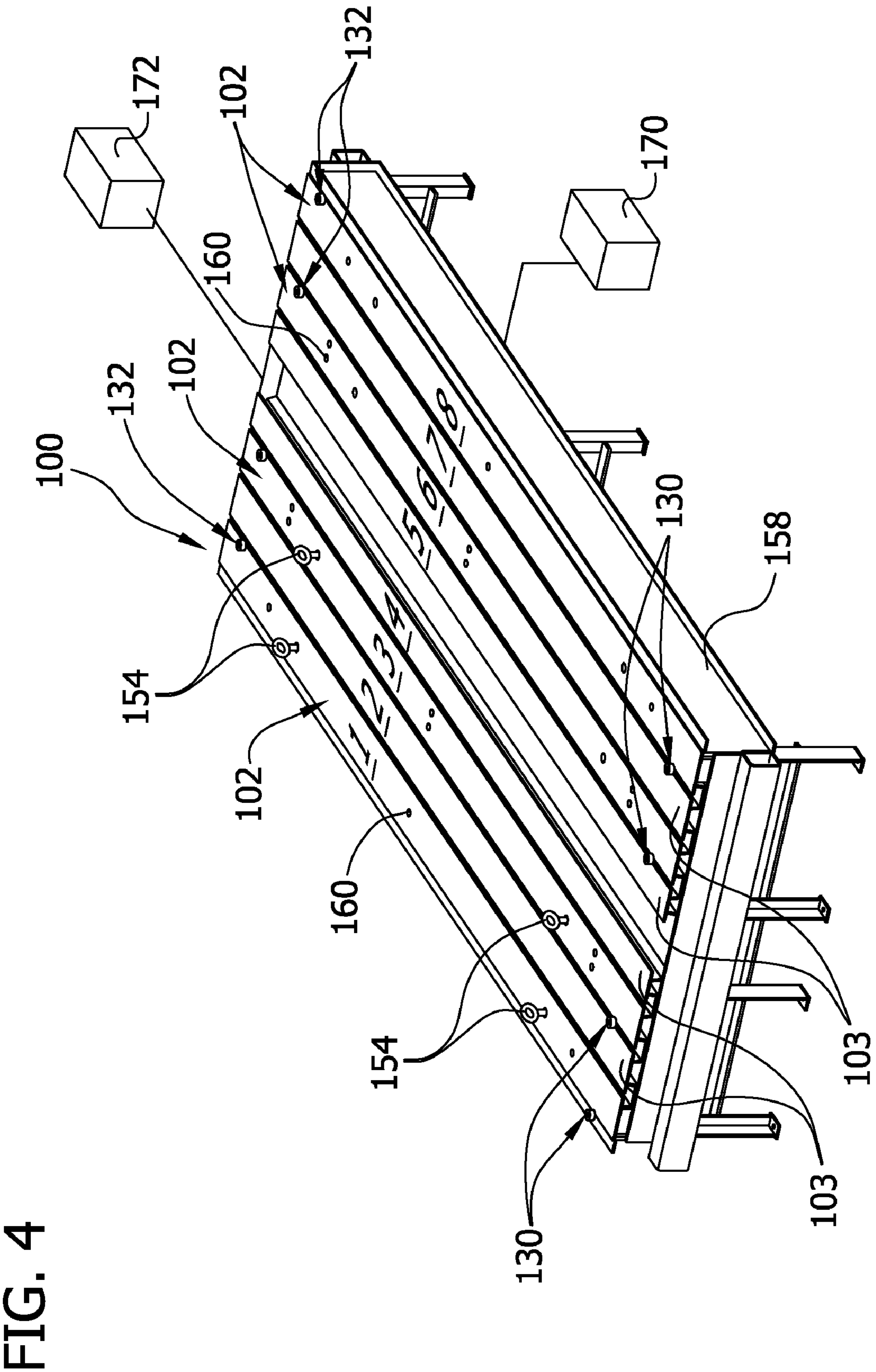
FIG. 4 is a perspective of a truss assembly jig setting table including a plurality of the plank units of FIG. 1.
Figure 5:
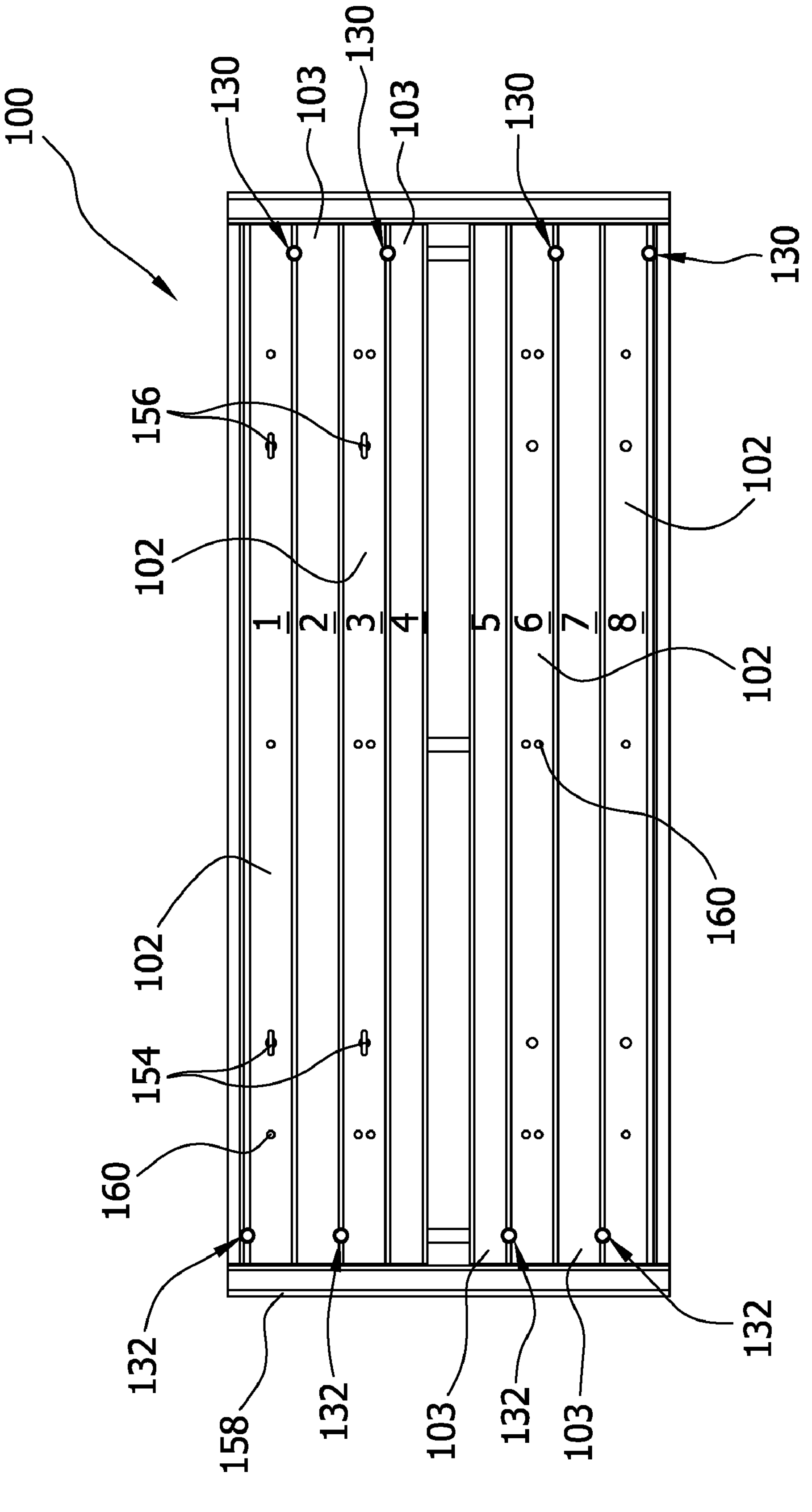
FIG. 5 is a top plan of the truss assembly jig setting table.

Referring to FIGS. 1-3, there can be seen a removable plank unit, generally indicated at 102, of a truss assembly jig setting system according to an embodiment of the present invention. Removable plank unit includes a plank, generally indicated at 104, which comprises a top surface 106 and opposing bottom surface 108, opposite first 110 and second 112 side surfaces, and front (broadly, first) 114 and rear (broadly, second) 116 ends. Planks 104 are typically made of steel, but may be made of any other durable material. Removable plank unit 102 may further include first 154 and second 156 transport members (e.g., threaded eye bolts) attached to plank 104, which aid in installation and removal of the removable plank unit. Removable plank unit 102 may also include apertures 160 through plank 104 through which fasteners, such as bolts, may be inserted for attaching removable plank unit 102 to a truss jigging table 100 (FIGS. 4 and 5). Alternatively, nails, rods, or any other fastener may be used to secure the removable plank unit 102 to the table 100. Removable plank units 102 may have different widths and lengths as required for the particular table into which the segments are to be installed.

A first motor plate 122 is affixed to bottom surface 108 of plank 104 near first end 114, and a first drive motor 118 is affixed to the first motor plate 122. Similarly, a second motor plate 124 with a second drive motor 120 affixed thereto is secured to the bottom surface 108 of the plank 104 near the second end 116. Alternatively, both drive motors 118, 120 may be attached to one of the motor plates near either end of the plank 104.

First and second threaded rods 128, 126 extend between the first and second motor plates 122, 124 and are rotatably secured thereto by bearings (only bearing 129 associated with the rod 128 is shown in the drawings). The bearings 129 allow the rods 126, 128 to rotate about their longitudinal axes, for reasons explained below. Preferably, the rods 126, 128 are arranged in a side by side configuration. In the alternative, the rods 126, 128 may be arranged vertically adjacent to one another. At least a portion of each rod 126, 128 is preferably disposed directly beneath the bottom surface 108 of plank 104, although the rods may be located entirely laterally of the plank without departing from the scope of the invention.

A pulley system, generally indicated at 150, 152, connects each drive motor 118, 120 to one of the rods 126, 128 in order to rotate the rods about their longitudinal axes. Each pulley system 150, 152 comprises an endless belt 162 wrapped around a first pulley 164 mounted on an output shaft 165 of the motor 118, 120, and a second pulley 166 mounted on the rod 126, 128.

A pair of puck assemblies, generally indicated at 130, 132, are operatively engaged with the rods 126, 128 so that rotation of the rods produces translational movement of the puck assemblies along the lengths of the rods. Each puck assembly 130, 132 comprises a puck 134, 136 secured to a puck carriage 142, 144 by a bolt 146, 148 extending through bores in the puck and puck carriage. Each puck carriage 142, 144 has a threaded aperture (not shown) through which the respective rod 126, 128 is inserted to mount the carriage on the rod. The thread of each aperture is a suitable complementary thread for transferring power, such as, for example, an acme or square thread. Accordingly, rotational movement of the rods 126, 128 produces translational movement of the respective puck carriages 142, 144 and the pucks 134, 136 along the length of the rod. Each puck 134, 136 sits atop respective puck carriage 142, 144 with an optional washer 138, 140 there between. The pucks 134, 136 are preferably made of steel, but may be made of any other durable material. The bottommost surface of each puck/washer combination is a wear surface that rests on top surface 106 of plank 104. The washer 138, 140 protects the puck 134, 136 from wear and can be replaced without replacing the puck. The washer 138, 140 can be made of a suitable low friction material such as nylon. It is to be understood that the puck assemblies may have other configurations within the scope of the present invention.

The location of puck assemblies 130, 132 in different slots on adjacent sides of the plank 104 of each removable plank unit 102, rather than within a single slot through the plank, allows for a more versatile and flexible puck setting system. Two pucks 134, 136 can thus typically be positioned along the length of even the shortest truss member. This also makes it easier to position more pucks 134, 136 nearer to either end of the table. In addition, because one puck 134, 136 is located on each side of each plank 102, the actual distance between pucks on adjacent planks is less than the "on-center" distance (the distance from the center of one plank to the center of a next plank) between planks.

In operation, activation of drive motor 118 in a first rotational direction produces rotation of rod 126 in the first rotational direction due to pulley system 150. Rotation of rod 126 in first direction causes translational motion of puck assembly 130 in a first translational direction along rod 126. For example, the first rotational direction may be clockwise, and the first translational direction may be away from the associated mounting plate 122. Rotation of drive motor 118 in the opposite direction accordingly causes translational motion of puck assembly 130 in an opposite, second translational direction along the rod 126. For example, the second rotational direction may be counterclockwise, and the second translational direction may be toward the associated mounting plate 122. Movement of puck assembly 132 is carried out in a like manner. Because each puck assembly 130, 132 is associated with a separate drive motor 118, 120, movement of puck assemblies 130, 132 may be carried out independent of one another. One of skill in the art will recognize that rotation of the drive motor may be translated to linear movement of the puck assembly by various other means, such as, for example, by a gear system.

It will be appreciated that removable plank unit 102 carries a completely self-contained puck movement system. This provides substantial flexibility to the table manufacturer in locating pucks 134, 136 on a new table, so that customized tables can be made at reasonable cost. Moreover, this allows removable plank units 102 to be retrofit to existing truss assembly jigging tables to create an automated truss assembly jig setting system without the expense of constructing or purchasing a completely new table. Removable plank unit 102 need only be connected to a power system and a computer control system to be suitable for automated puck positioning.

It is understood that it is also advantageous to manufacture an original jigging table including the removable board segments 102.

Referring now to FIGS. 4 and 5 there can be seen a truss assembly jigging table 100 that has been retrofit with removable plank units 102 to create an automated truss assembly jig setting table. As can be seen, truss assembly table 100 comprises a table frame 158 fitted with a plurality of plank units in numbered positions 1-8. Note that tables with greater or fewer plank units may also be placed according to the present invention. Originally, table 100 would have included traditional plank units 103 in all positions. To retrofit the table for an automated truss assembly jig setting system, planks 103 in positions 1, 3, 6, and 8 were removed and removable plank units 102 were inserted. This creates a table having one puck assembly 130 or 132 between each pair of adjacent plank units. This allows each puck assembly 130, 132 the ability to be positioned anywhere along the length of the table 100. It will be understood that the table 100 can be originally manufactured in the configuration illustrated in FIGS. 4 and 5. Alternatively, removable plank units 102 may be inserted into any other combination of positions 1-8 as assembly of a particular truss design may dictate. For example, removable plank units 102 may be inserted into all of the positions 1-8, in which case each adjacent pair of plank units would have two puck assemblies there between. Although depicted as being retrofitted across the width of a table, removable segments 102 can be configured to be installed lengthwise or at an angle across a table.

Figure 6:
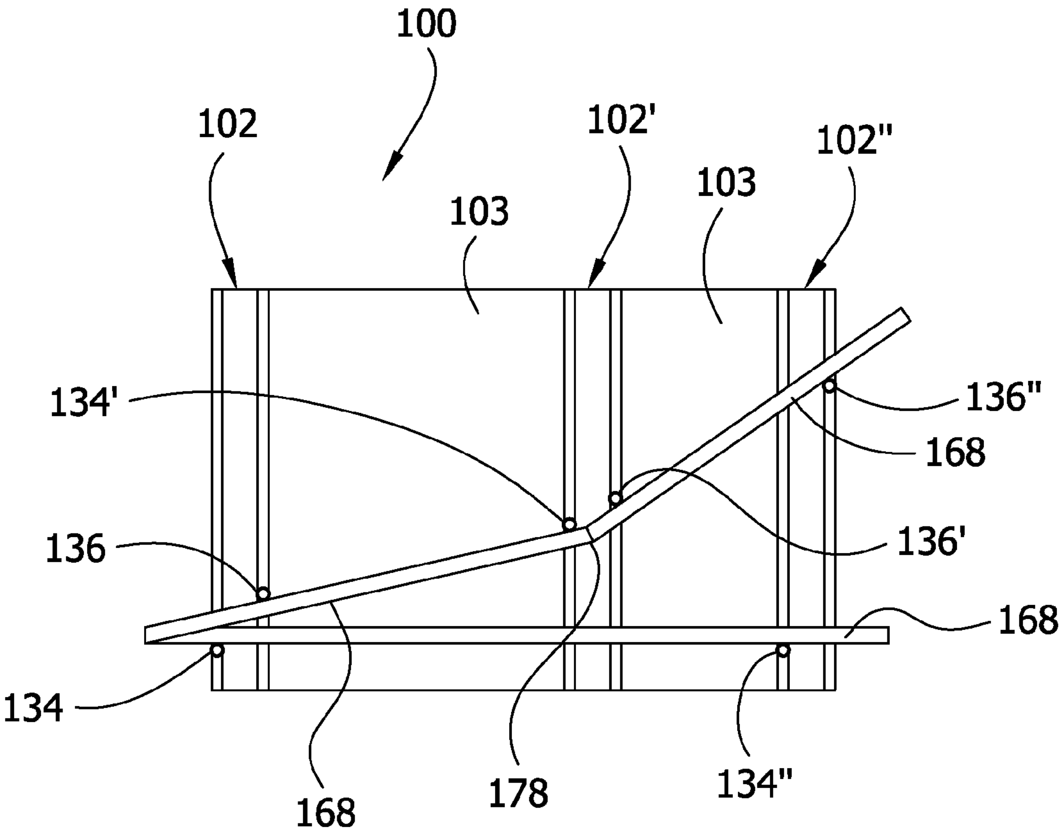
FIG. 6 is a partial top plan of the truss assembly jig setting table with truss members arranged thereon.

Because the puck assemblies 130, 132 of the plank unit 102 are on opposite sides of the board and are independent of each other, both puck assemblies of a single board may engage either the top of bottom chord members 168 of the truss. For example, as seen in FIG. 6, the puck 134' of the of the middle plank 102' is disposed to the left of a pitch break 178 in the upper truss chord and the other puck 136' is disposed to the right of the same pitch break. Because the width of the plank unit 102 is preferably between about 6 in (15 cm) and about 10 in (25 cm), the pucks 134', 132' engage the truss chord members adjacent to the pitch break 178 to improve accuracy of manufacture of the truss. Further, the pucks 134, 136 may be positioned within the interior of the perimeter of the truss so that the pucks engage interior surfaces of the chord members, as seen by puck 136" of plank unit 102" in FIG. 6. It is understood that one of the pucks 134, 136 of the plank unit 102 may be positioned within the interior of the truss, both of the pucks, or neither of the pucks, within the scope of the present invention.

It is understood that the distance between removable plank units 102 may be varied. In addition, the width of the removable plank units 102 themselves can vary. This allows puck assemblies 130, 132 to be optimally placed depending on the locations of the particular truss members 168 of a given truss. This also allows removable plank units 102 to be fitted to a greater variety of existing truss tables, as a particular table layout is not required in order to retrofit removable plank units 102.

Referring to FIG. 4, truss assembly table 100 need only be connected to a power system 170 (connection being shown schematically by solid lines) and a computer control system 172 (connection being shown schematically by dashed lines) having software capable of positioning the pucks to create an automated truss assembly jig setting table. Software programs are well known and generally available that can calculate the positions of the pucks on the table and activate the drive motors to move the pucks to their proper positions. Typically, the shape of a truss is known and its details are fed into the control system, which then activates the drive motors and moves the pucks into their desired positions.

Figure 7:
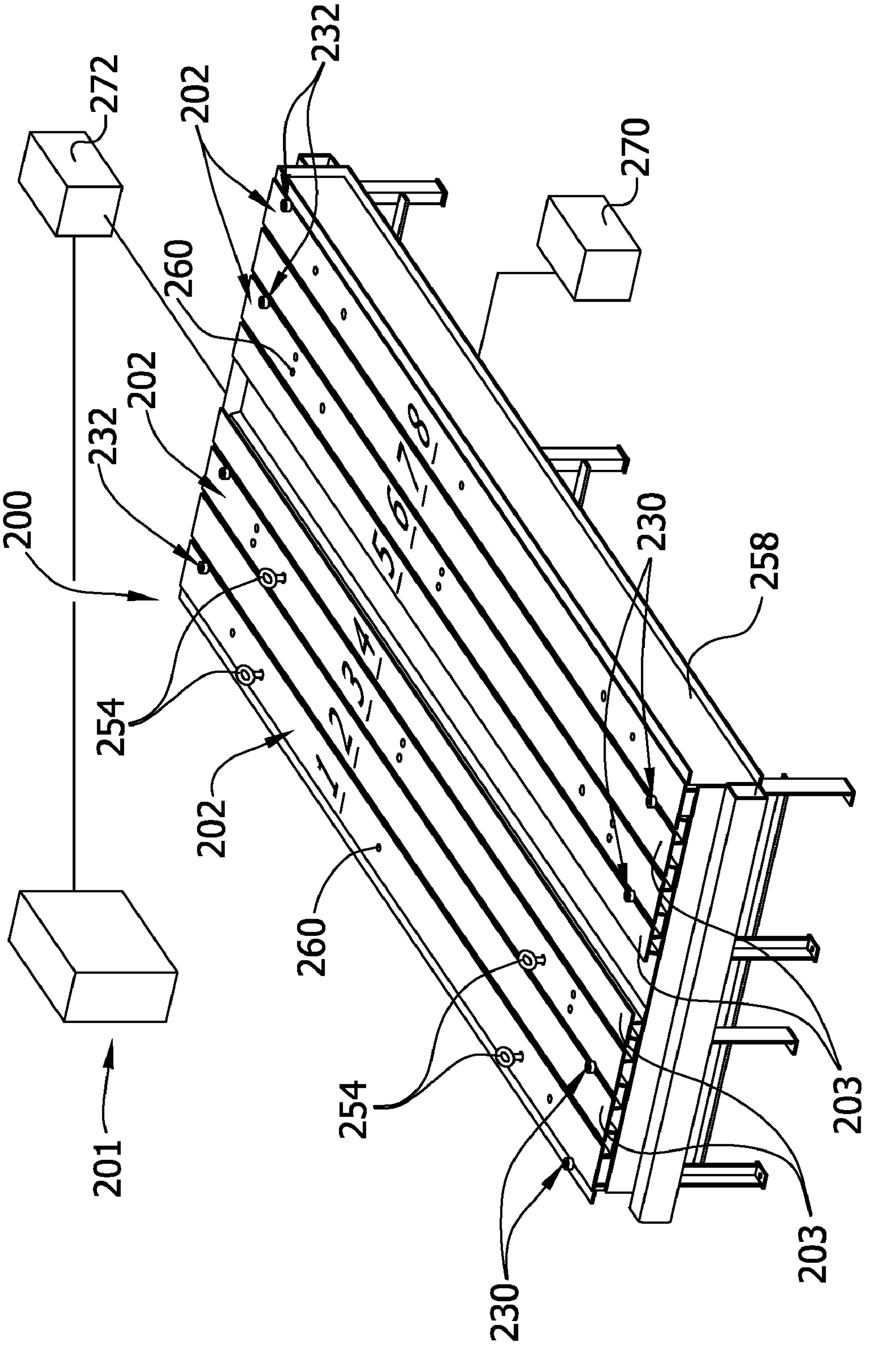
FIG. 7 is a perspective of another embodiment of a truss assembly jig setting table.
Figure 8:
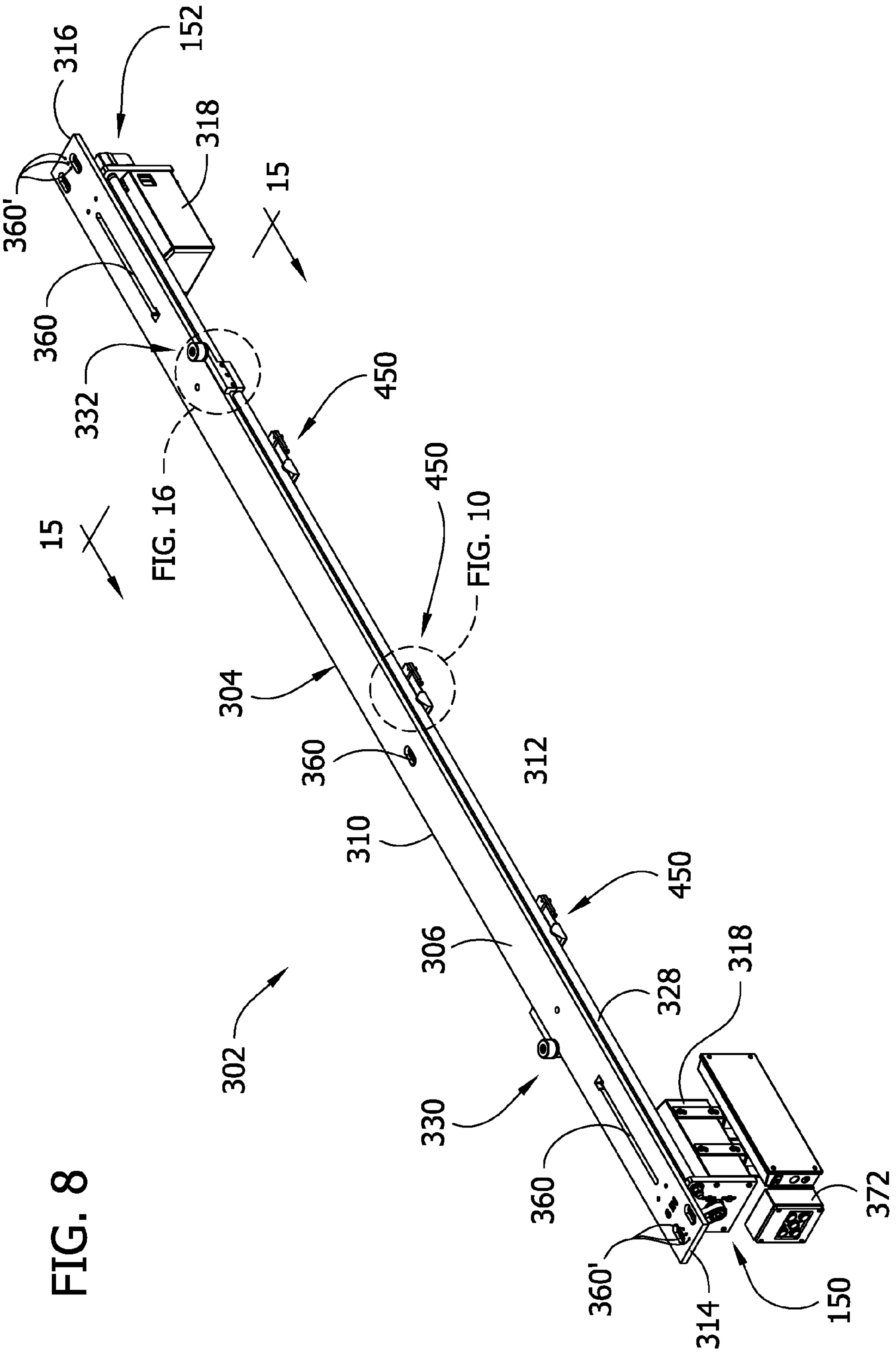
FIG. 8 is a perspective of another embodiment of removable plank unit.

Referring to FIG. 7, another embodiment of a truss assembly table is generally indicated at 200. This table is similar to the prior embodiment 100, and therefore, like components are indicated by corresponding reference numerals plus 100. The difference between this table 200 and the prior embodiment 100 is that the present table has a laser projection system, generally indicated at 201, that projects a laser image of a desired truss in actual shape and size on the work surface, which ensures greater accuracy in truss assembly (not shown). Some fragment(s) of the truss or component part(s) may be projected onto the upper surface of the table without departing from the scope of the present invention. The laser projection system 201 may be interfaced with the same computer control system 272 as the removable plank units 202, or may be interfaced with a different controller. The laser projection system 201 may also be electrically connected to the same power system 270 as the plank units 202. Known laser truss assembly systems are disclosed in U.S. Pat. No. 6,317,980 (owned by the owner of this application), the entirety of which is herein incorporated by reference for providing complete disclosure.

Referring still to FIG. 7, the removable plank units 202 of the type described above are advantageously placed in the truss assembly table 200. Placing removable plank units 202 in the table 200 creates a table that utilizes both laser projection and automated puck positioning. Use of an automated system dramatically increases the speed and efficiency of the system relative to standard laser projection systems. In addition, placing the automated system in a laser projection system, rather than a standard table, provides a check on the automated system such that an operator can easily tell whether it is functioning accurately and reliably.

Figure 9:
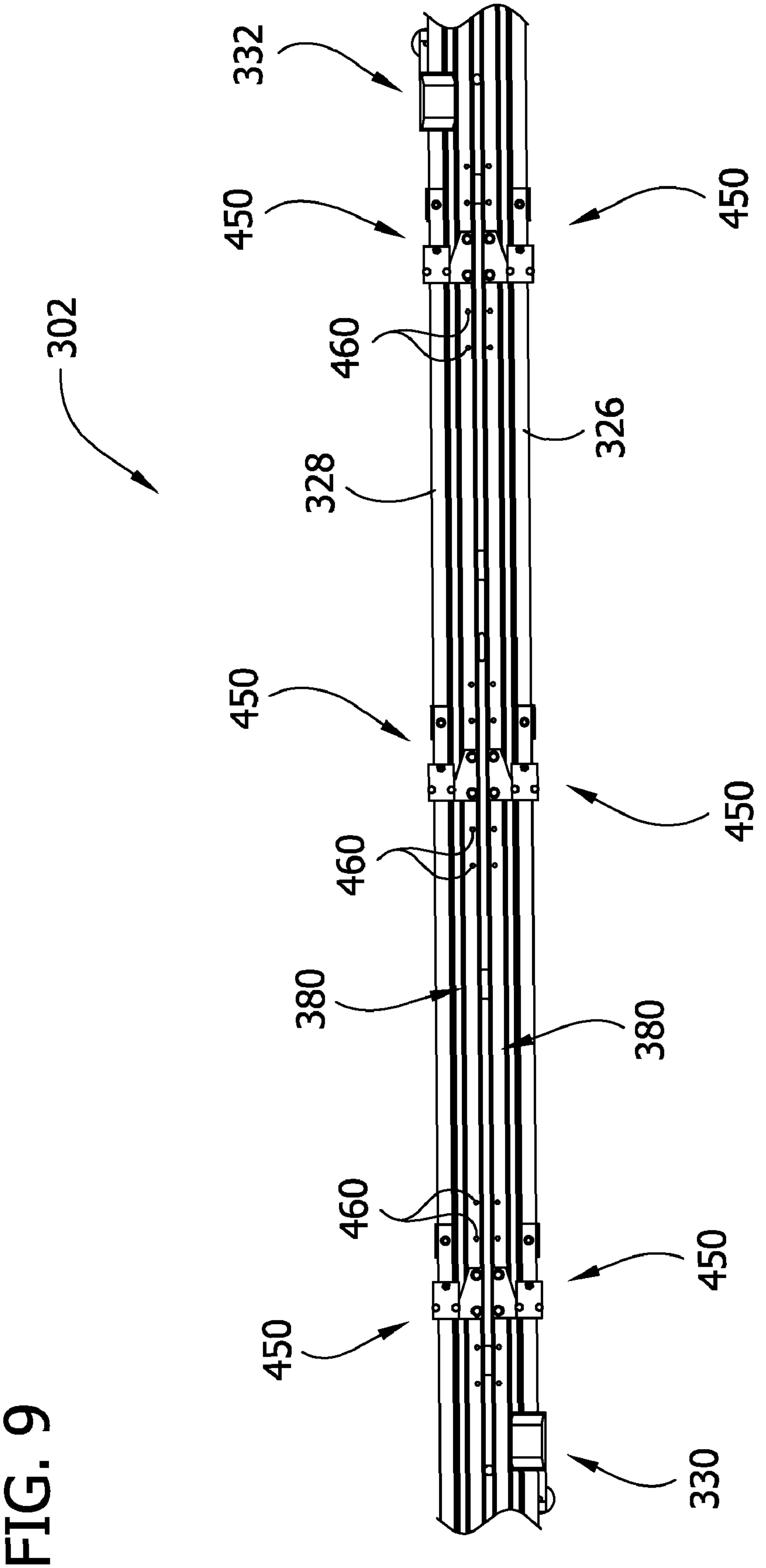
FIG. 9 is a bottom plan view of the plank unit.
Figure 10:
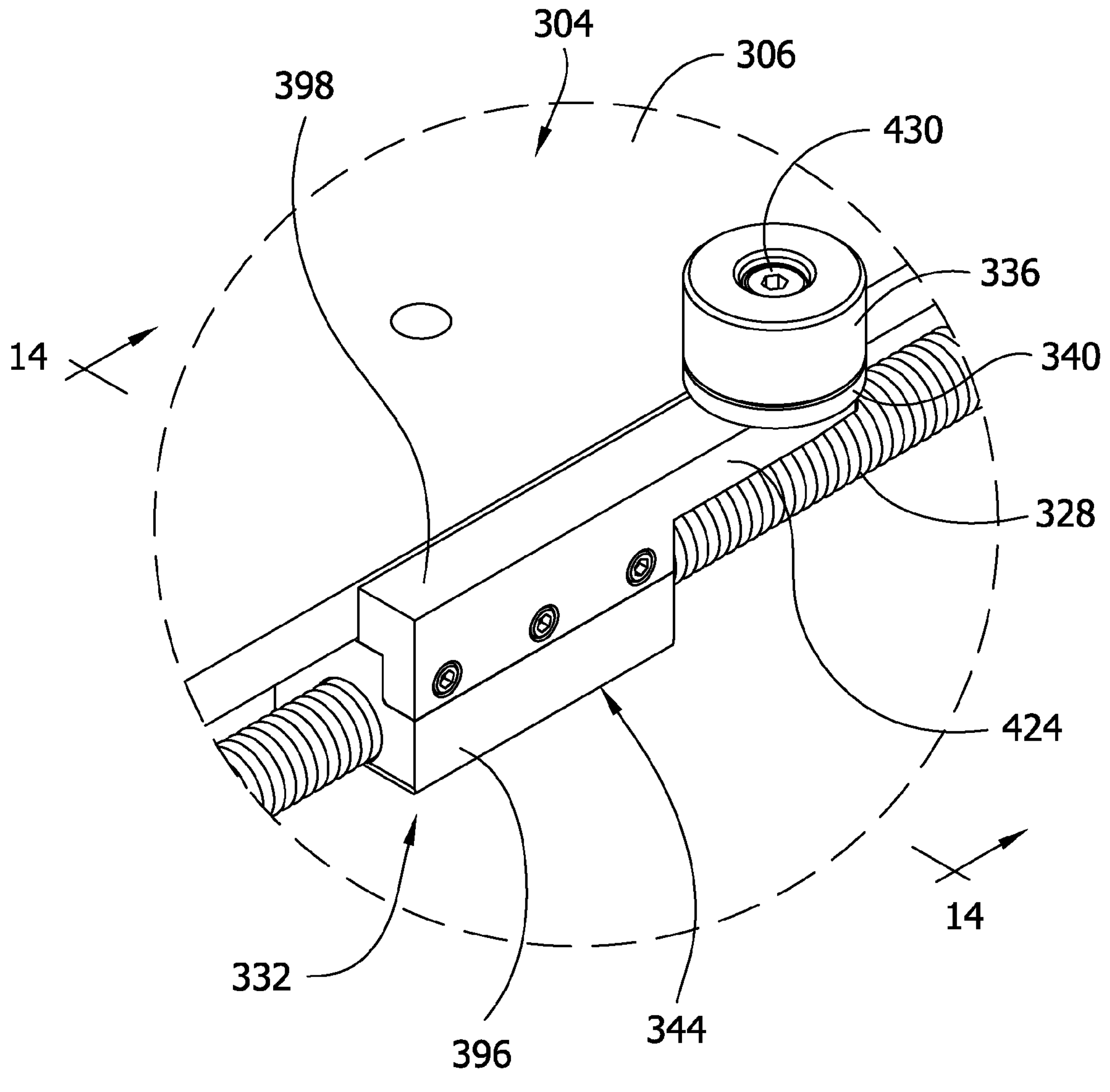
FIG. 10 is an enlarged fragmentary perspective taken as indicated in FIG. 8 showing a puck assembly.
Figure 11:
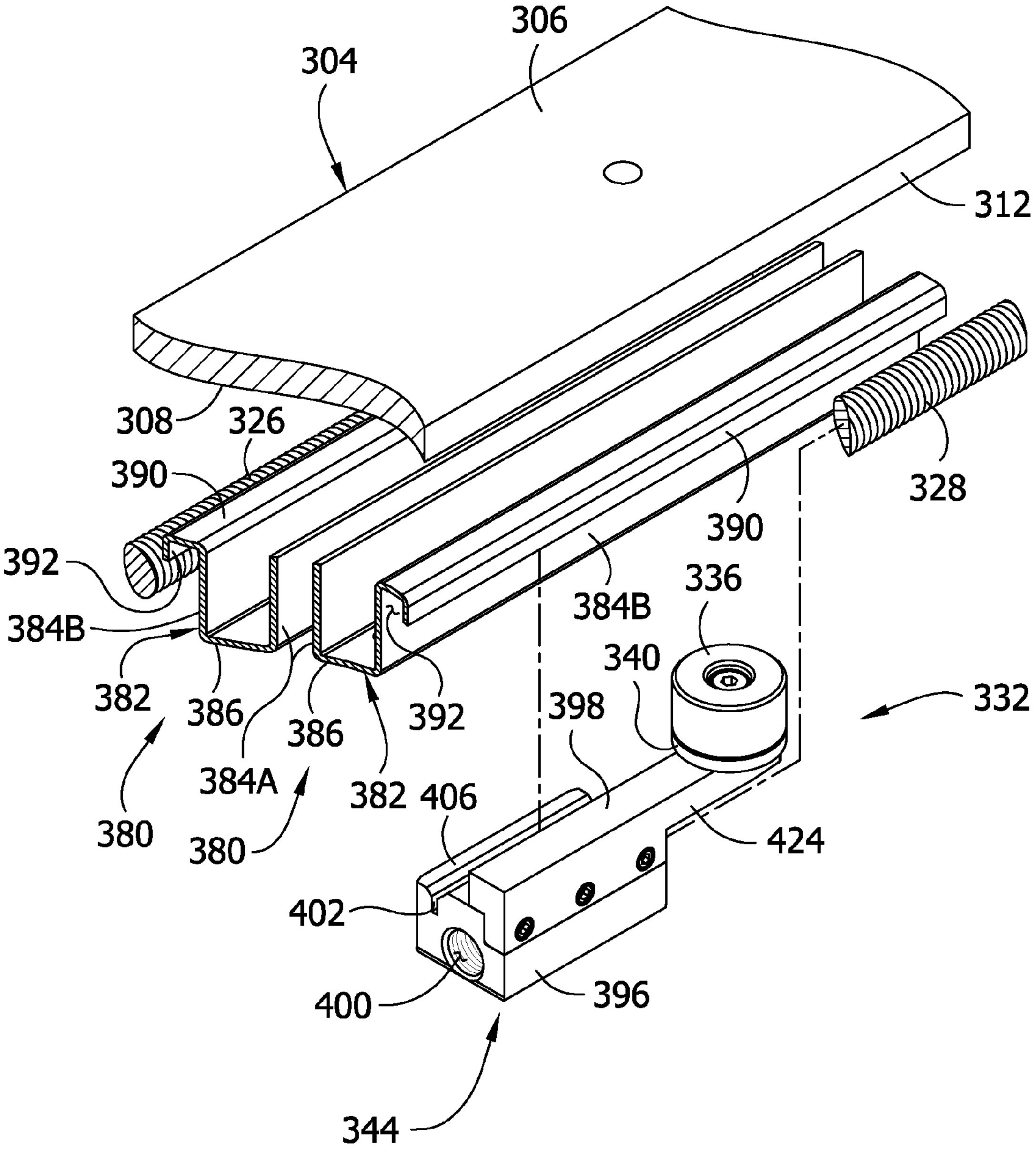
FIG. 11 is an exploded view of FIG. 10.
Figure 12:
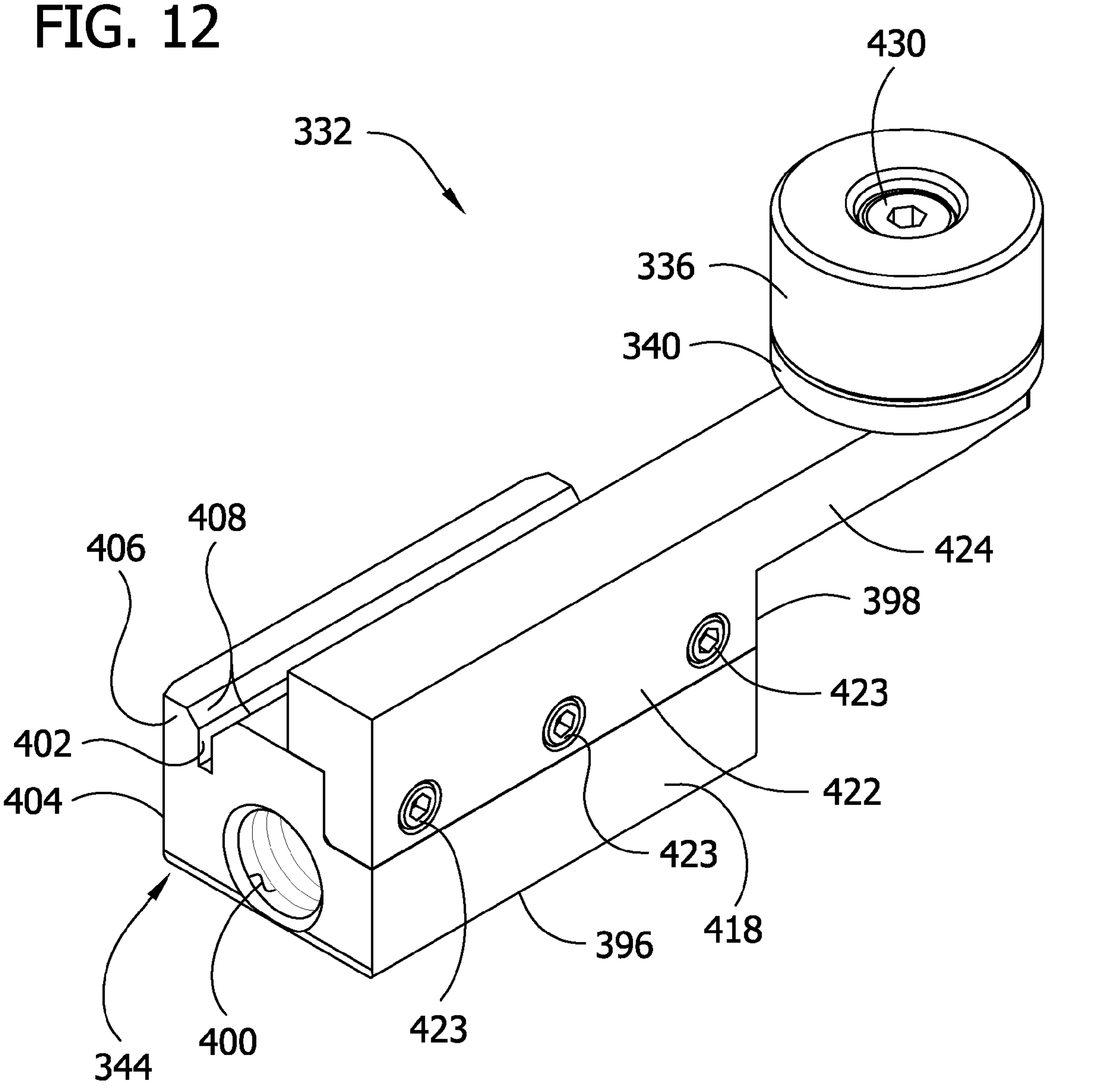
FIG. 12 is an enlarged perspective of the puck assembly of FIG. 11.

Referring now to FIGS. 8-21, another embodiment of a removable plank unit is generally indicated at 302. This embodiment is similar to the plank unit 102, and therefore, like components are indicated by corresponding reference numerals, plus 200. Referring to FIGS. 9, 11 and 14, a pair of laterally spaced apart elongate struts, generally indicated at 380, extend along the length of the plank 304 and are secured to the bottom surface 308 of the plank to provide structural support against bending when large loads are applied to the upper surface 306 during assembly of a truss. As seen best in FIGS. 11 and 14, each strut 380 includes a generally U-shaped body, generally indicated at 382, having spaced apart inner and outer legs 384A, 384B, respectively, extending downward from the bottom surface 308 of the plank 304 and a web member 382 extending between and connecting lower ends of the legs. An L-shaped arm 390 extends laterally outward from an upper end of each outer leg 384B of the U-shaped bodies 380. For purposes explained below, the outer leg of 384B of each base 382 and the respective L-shaped arm 390 together constitute a track defining an inverted channel 392 for receiving a portion of a corresponding puck assembly.

The plank 304 includes apertures 360 for attachment of the plank unit 302 to the table. Three openings 360' at each longitudinal end of the plank are roll pin openings for receiving roll pins (not shown) through the plank into connection with a mounting plate of the table to fix the plank unit in position after it has been aligned and calibrated. An opening in the mounting plate of the table (not shown) is drilled only after the alignment and calibration is completed. If it later becomes necessary to remove the plank unit 302 for repair (for example), the plank unit 302 can be removed and then replaced by inserting roll pins through the same openings 360' previously drilled in the table mounting plate. This permits the plank unit 302 to be reinstalled without requiring re-calibration.

Referring to FIGS. 10-15, the puck assemblies 330, 332 of the present embodiment are substantially identical in structure, and therefore, only puck assembly will be described in detail. The puck carriage 344 (indicated generally) of the puck assembly 332 includes a base 396 having a threaded bore 400 for receiving and threadably engaging the rod 328 (FIG. 10) and a mount 398 on which the puck 336 and the washer 340 are mounted. In one example, the base 396 is formed from an oil impregnated nylon material, such as NYLATRON, although other materials may be used. The mount 398 may be formed from aluminum, although other materials may be used.

A longitudinal guide slot 402 is formed in an upper portion of the base 396 adjacent to an inner side 404 of the base. Referring to FIG. 14, the guide slot 402 receives the free end of the L-shaped arm 390 of the corresponding strut 380 so that an upper, longitudinal portion 406 of the base 396 is received in the inverted channel 392, as described briefly above. An upper portion 408 (FIGS. 14 and 12) of the slot 402 tapers downward to facilitate insertion of the L-shaped arm 390 into the slot. As seen best in FIG. 14, the puck assembly 344 is further guided and its rotation restricted by virtue of a lower portion 412 of the inner side wall 404 of the base 396 the outer leg 384B of the strut 380. During use, the track defined by the L-shaped arm 390 and the base 382 of the strut 380 guides the puck assembly 344 along the length of the rod 328 and prevents rotation of the base 396 with the rod to thereby ensure that puck assembly moves linearly along the rod as the rod rotates. Other ways of guiding and preventing rotation of the puck assemblies is within the scope of the invention.

Figure 13:
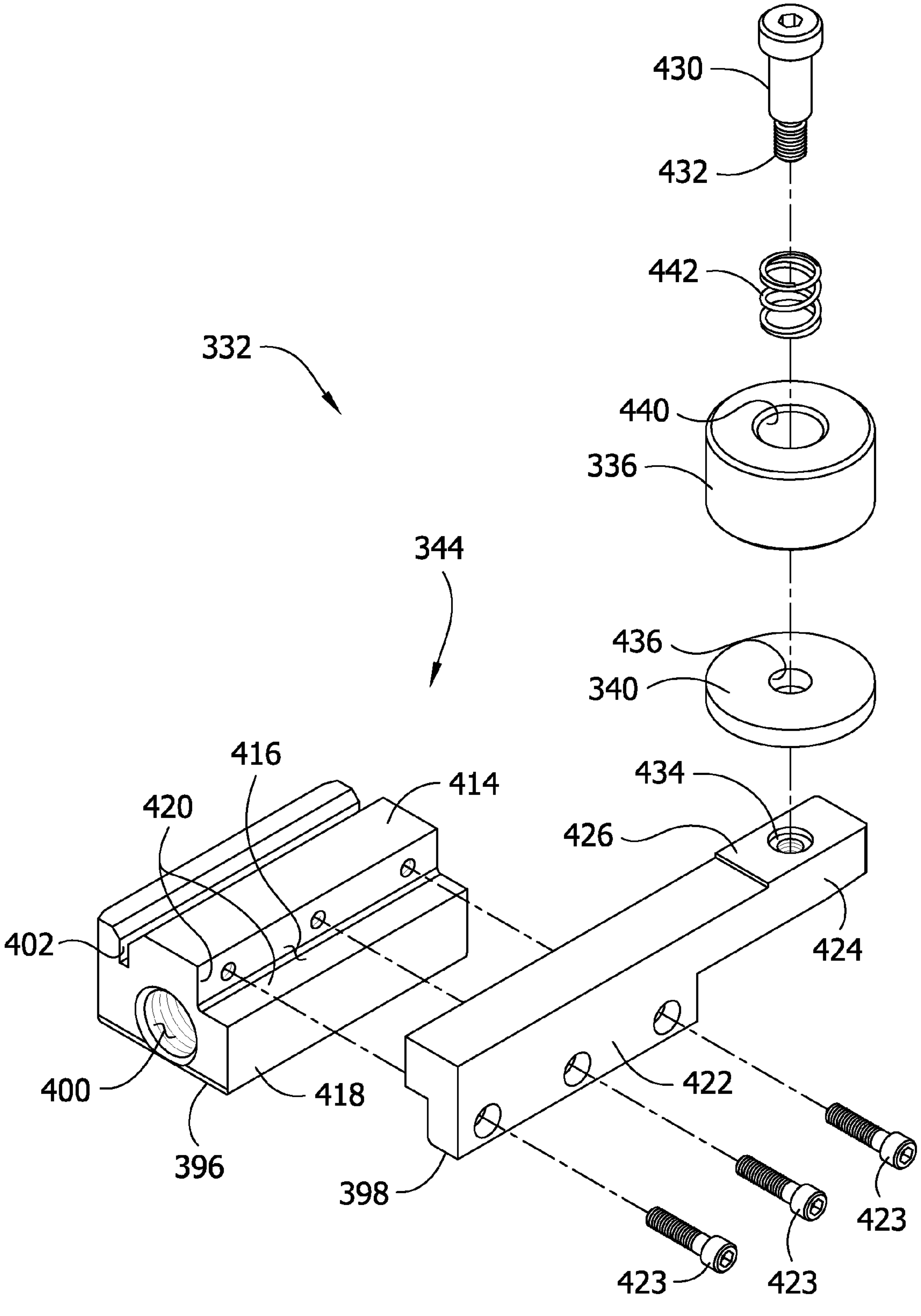
FIG. 13 is an exploded perspective of the puck assembly of FIG. 12.
Figure 14:
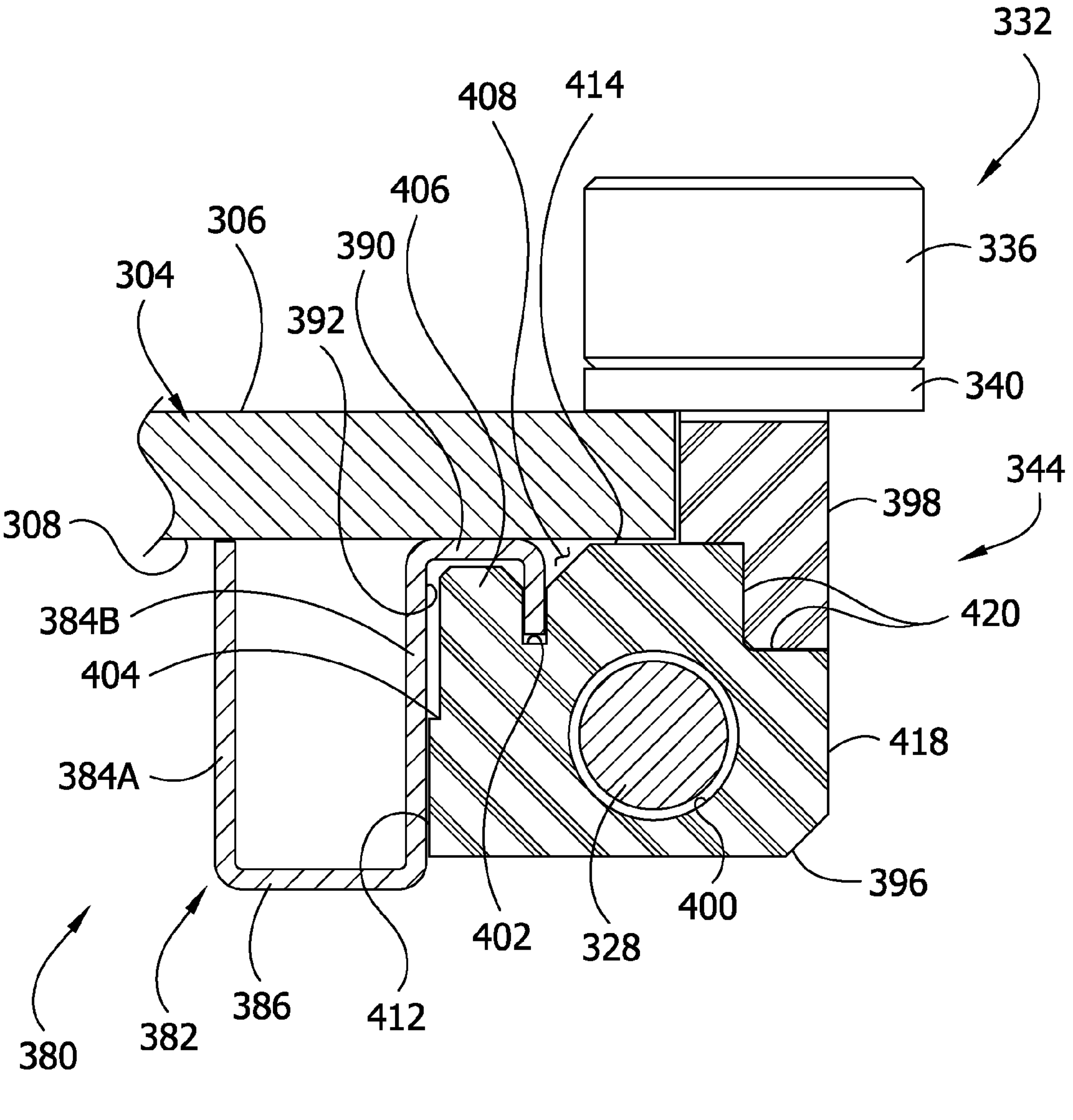
FIG. 14 is a section taken in the plane containing the line 14-14 in FIG. 10.

Referring to FIG. 13, the mount 398 of the puck assembly 344 is secured within a notch 416 extending through an outer side wall 418 and the upper surface 414 of the base 396. As seen best in FIG. 14, a section of the mount 398 engaging the base 396 has a cross-section that is generally an inverted L-shape so that the mount rests substantially flush against the upper surface 414 of the base and surfaces 420 defining the notch 416 and so that an outer side surface 422 of the mount extends up from and is substantially coplanar with the outer wall 418 of the base. As seen best in FIG. 13, the mount 398 is secured to the base 396 by three fasteners 423 extending through the outer side surface of the mount 422 and threaded into one of the surfaces 420 defining the notch 416. Referring still to FIG. 13, an elongate finger 424 of the mount 398 extends rearward from an upper portion of the L-shaped section. A top surface 426 of the finger at a free end margin where the puck 336 and the washer 340 are mounted is generally coplanar with the top surface 306 of the plank 304. Other ways of securing the mount to the base and/or making the carriage assembly are within the scope of the invention.

Figure 15:
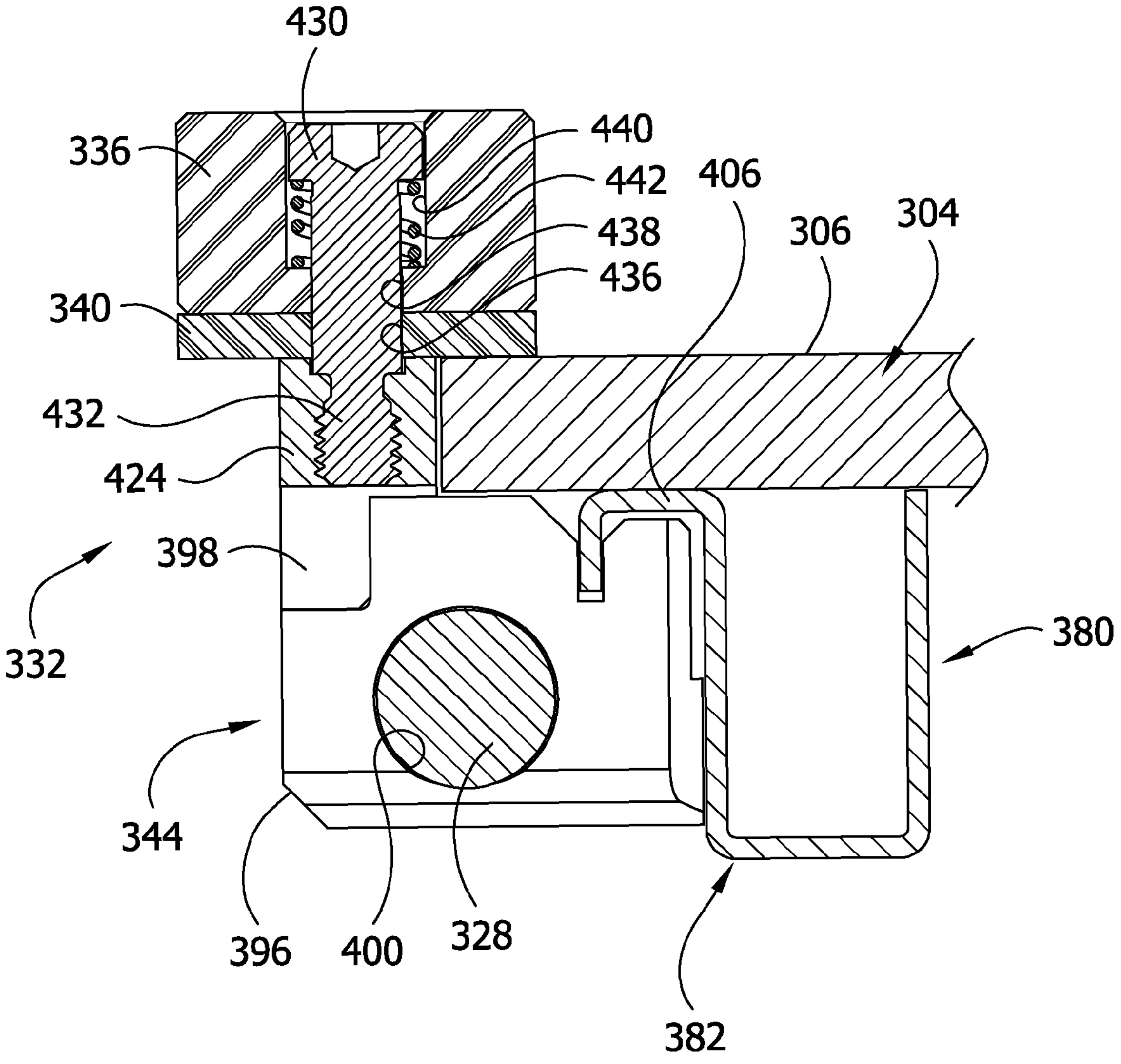
FIG. 15 is a section taken in the plane containing the line 15-15 in FIG. 8.

Referring now to FIGS. 13 and 15, a shoulder bolt 430 secures the puck 336 and the washer 340 to the finger 424 of the mount 398. A threaded, free end margin 432 of the shank of the bolt 430 is threaded into a blind bore 434 of the finger 424 so that the remaining non-threaded portion of the shank extends upward through bores 436, 438 in the washer 340 and the puck 336 and into a counter-bore 440 in the puck. A compression spring 442 disposed around the non-threaded portion of the shank of the bolt 430 is captive within the counter-bore 440 of the puck 336 by a bottom surface defining the counter-bore and the head of the bolt. The spring 442 biases the puck 336 and the washer 340 downward in contact with the top surface 306 of the plank 304 and allows the puck and the washer to move upward and downward along the axis of the bolt 430 as the puck is driven linearly along the length of the plank. In this way, the puck assembly 332 may be used with a plank having somewhat non-linear upper surface that slopes along its length because the vertical position of the puck compensates for any irregular, non-linear portions of the top surface on which it is riding. Other ways of varying the vertical position of the puck as it moves along the plank to compensate for irregularities of the plank are within the scope of the present invention.

Referring back to FIGS. 8 and 9, a plurality of rod-supporting assemblies, generally indicated at 450, extend laterally outward from each of the struts 380 below the plank 304 and engage the rods 328, 326. Corresponding generally aligned rod-supporting assemblies 450 support each rod 328, 326 to substantially prevent sagging or bowing of the rods due to gravity and to maintain the general linearity of the rod as the rod rotates about its axis. In the illustrated embodiment, three rod-supporting assemblies 450 are spaced equally apart along the length of each rod (the rod-supporting assemblies associated with the rod 326 are not visible in FIG. 8), although it is understood that the plank unit may have more or fewer rod-supporting assemblies within the scope of the invention.

The rod-supporting assemblies 450 are substantially identical, and therefore, only one rod-supporting assembly will be described in detail. Referring to FIGS. 16-23, the rod-supporting assembly 450 includes a base plate 452 having an inner end margin secured to the web 386 of the respective strut 380 and a saddle block, generally indicated at 454, cantilevered from an outer end margin of the base by a resiliently elastic bar 455. The bar 455 exerts an upward force on the block 454, which is transferred to the rod 328 to maintain the linearity of the rod. The rod-supporting assemblies 450, by way of the saddle block 454 and resiliently flexible cantilever bar 455, and the spring 442 of the resiliently movable pucks 334, 336 together act to dampen vibrations and noise of the system as the rods are rotated and the pucks are moving linearly along the rods.

Figure 18:
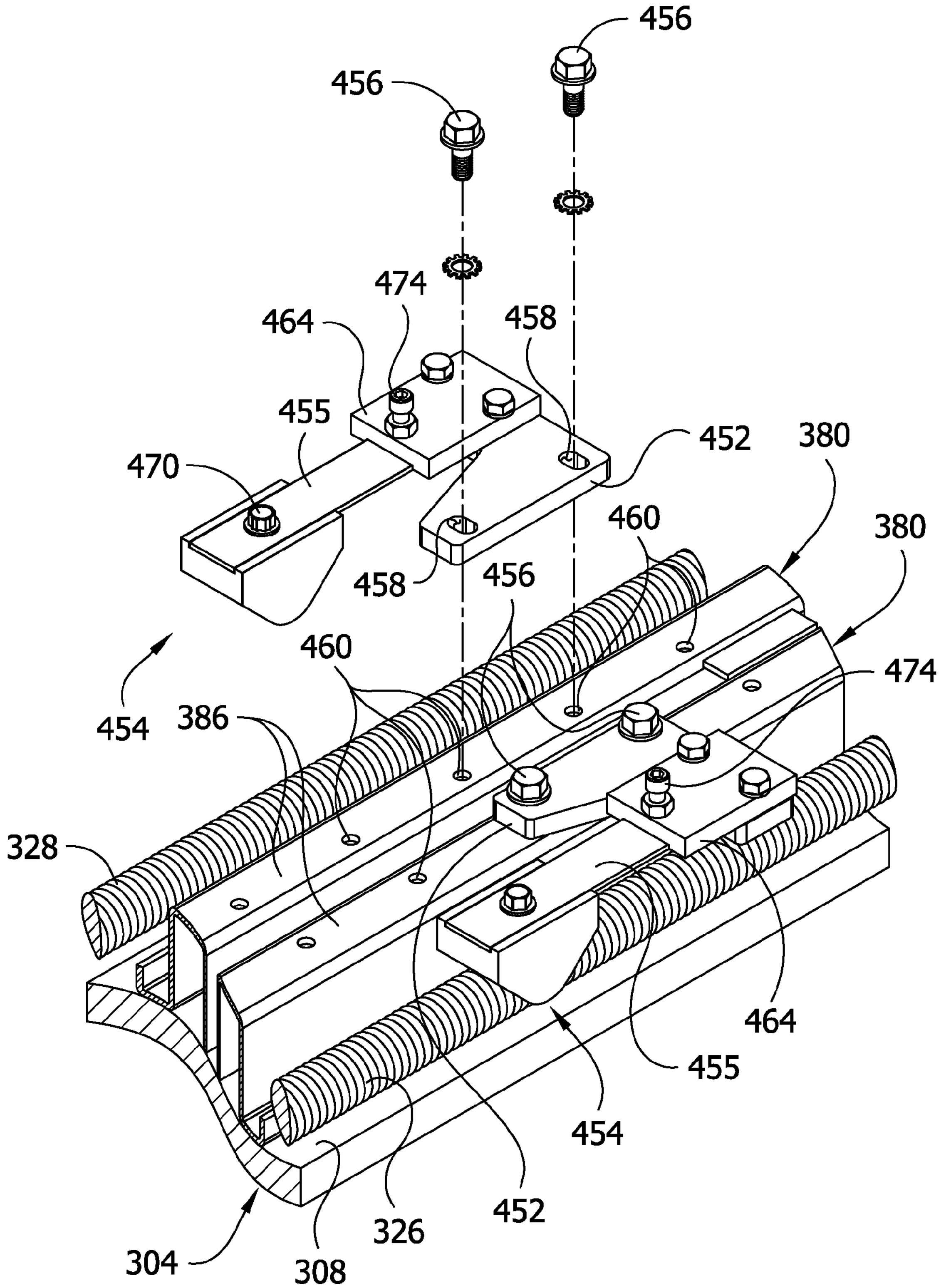
FIG. 18 is an enlarged fragmentary perspective; similar to FIG. 16, but showing the underside of the plank and with the rod-supporting assembly exploded from the plank unit.

As seen best in FIG. 18, the base plate 452 is secured to the strut 380 using threaded fasteners 456 (e.g., bolts) extending through openings 458 in the base plate and threaded into in bores 460 in the web 386. Referring still to FIG. 18, the web 386 has a plurality of such bores 460 spaced along the length of the strut 380 for securing the rod-supporting assemblies 450 at selective longitudinal positions.

Figure 16:
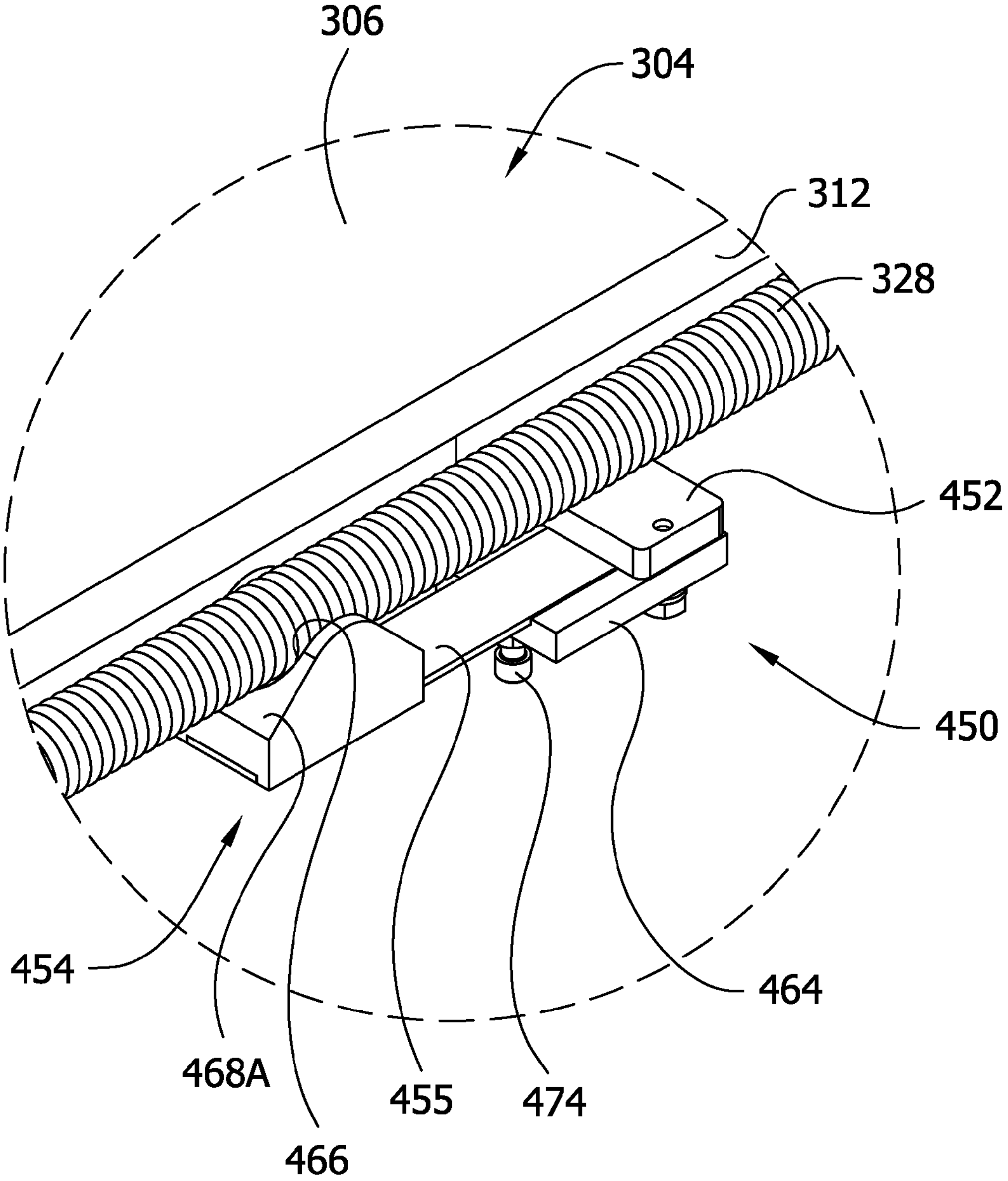
FIG. 16 is an enlarged fragmentary perspective taken as indicated in FIG. 8 showing a rod-supporting assembly.
Figure 17:
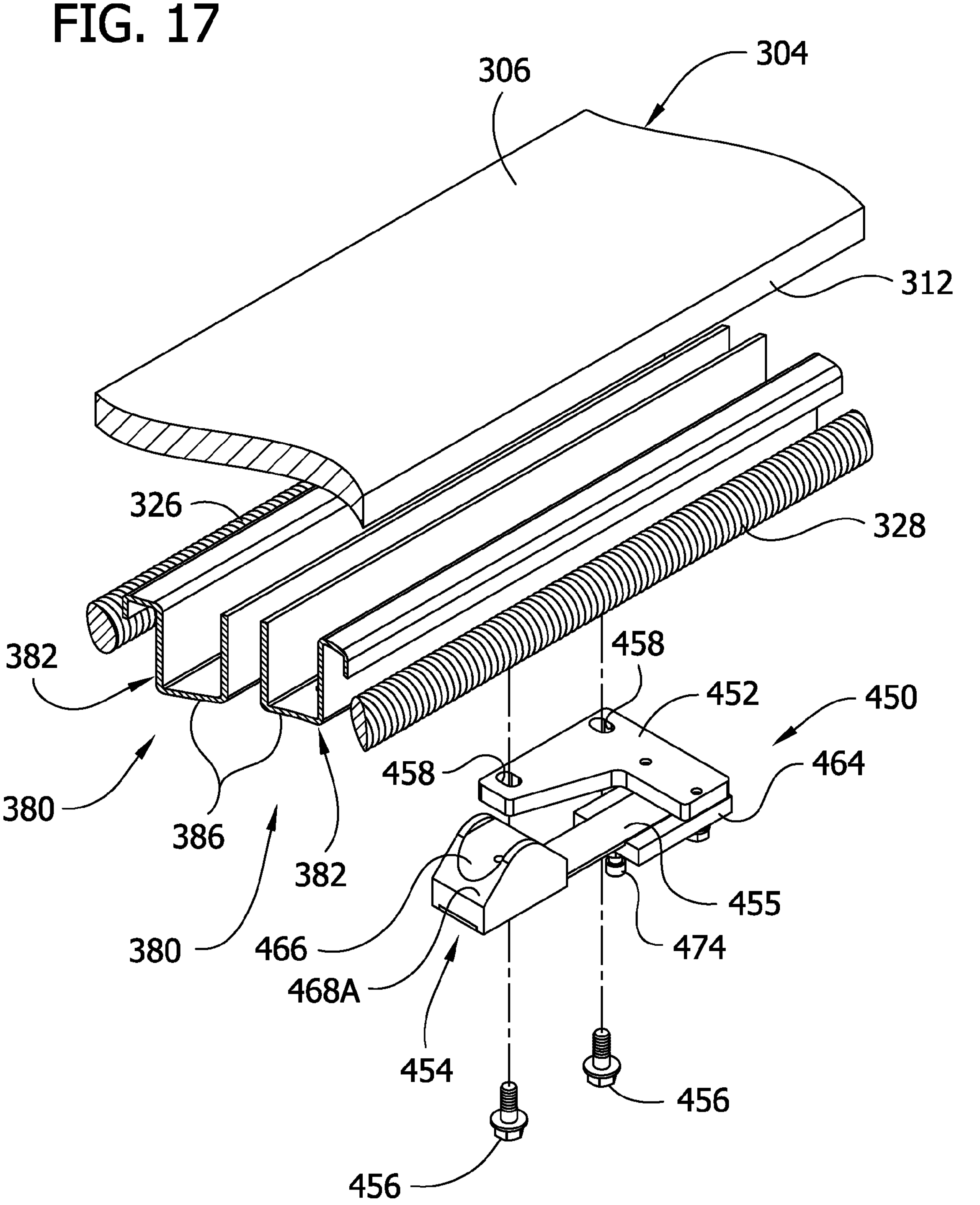
FIG. 17 is an exploded view of FIG. 16.
Figure 19:
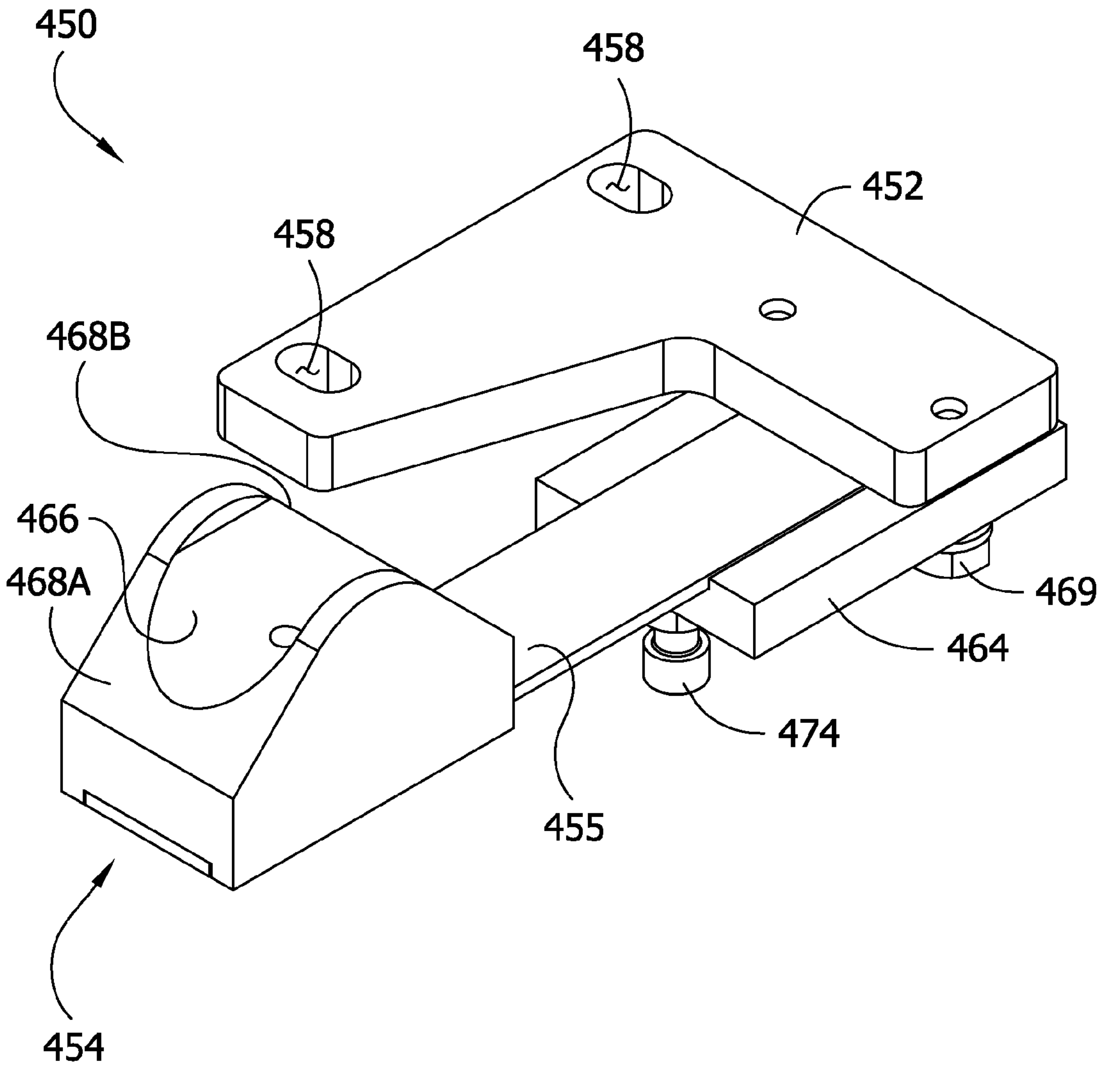
FIG. 19 is an enlarged perspective of the rod-supporting assembly.
Figure 20:
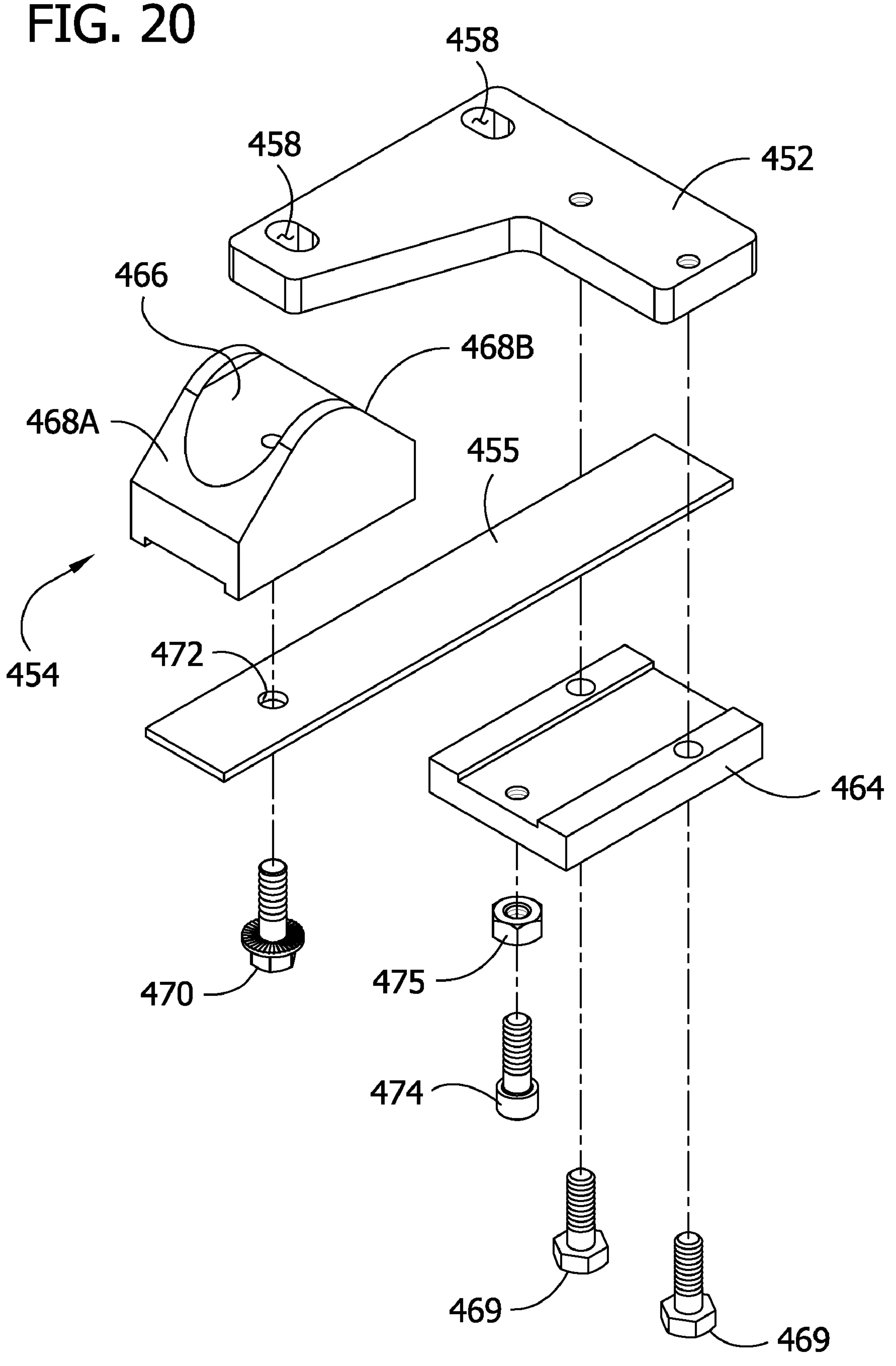
FIG. 20 is an exploded view of the rod-supporting assembly of FIG. 19.

Referring to FIGS. 16, 19 and 20, the saddle block 454 has a concave, upper support surface 466 extending longitudinally through upwardly sloping front and rear faces 468A, 468B of the block. The support surface 466 partially receives a longitudinal portion of the rod 328 therein, and may, for example, extend about 180 degrees around a circumference of the rod. The concave shape of the support surface 466 retains the rod 328 in the saddle 454 as the rod 328 rotates so that the saddle continuously engages and supports the rod as the rod rotates during use. Thus, the linearity of the rod is maintained during use and allows the rods to be rotated at higher rates. The saddle may be formed from NYLATRON, although it may be made from other materials.

As seen best in FIGS. 19 and 20, a first end of the cantilever bar 455 is secured to the base plate 452 using a compression plate 464 secured to the base plate using fasteners 469 (e.g., bolts) so that the bar is sandwiched between the base plate and the compression plate. The cantilever bar 455 is secured to a bottom of the saddle block 454 by a threaded fastener 470 (e.g., bolt, FIG. 20) extending through a hole 472 in the bar 455 and threaded into the block. The cantilever bar 455 may be formed from metal or other material. A tension-adjustment member 474 is threaded through a nut 475 and a bottom of the compression plate 464 and contacts a bottom of the cantilever bar 455. Selectively setting the length of the tension-adjustment member 474 extending above the compression plate 464 respectively decreases and increases the upward force of the bar 455 that is exerted on the rod 328.

Figure 21:
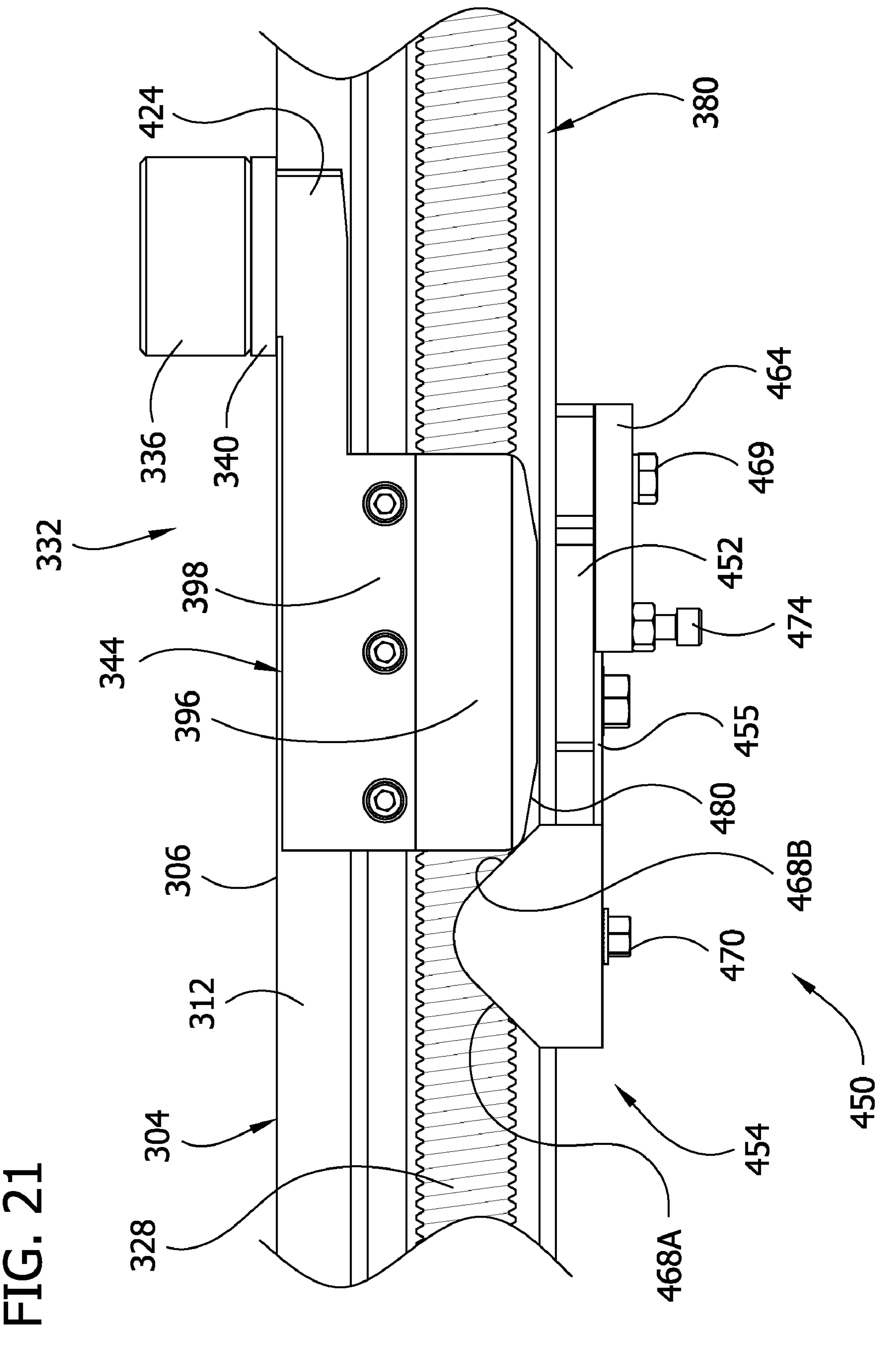
FIG. 21 is a fragmentary side elevation of the plank unit showing the puck carriage when it first contacts the rod-supporting assembly.
Figure 22:
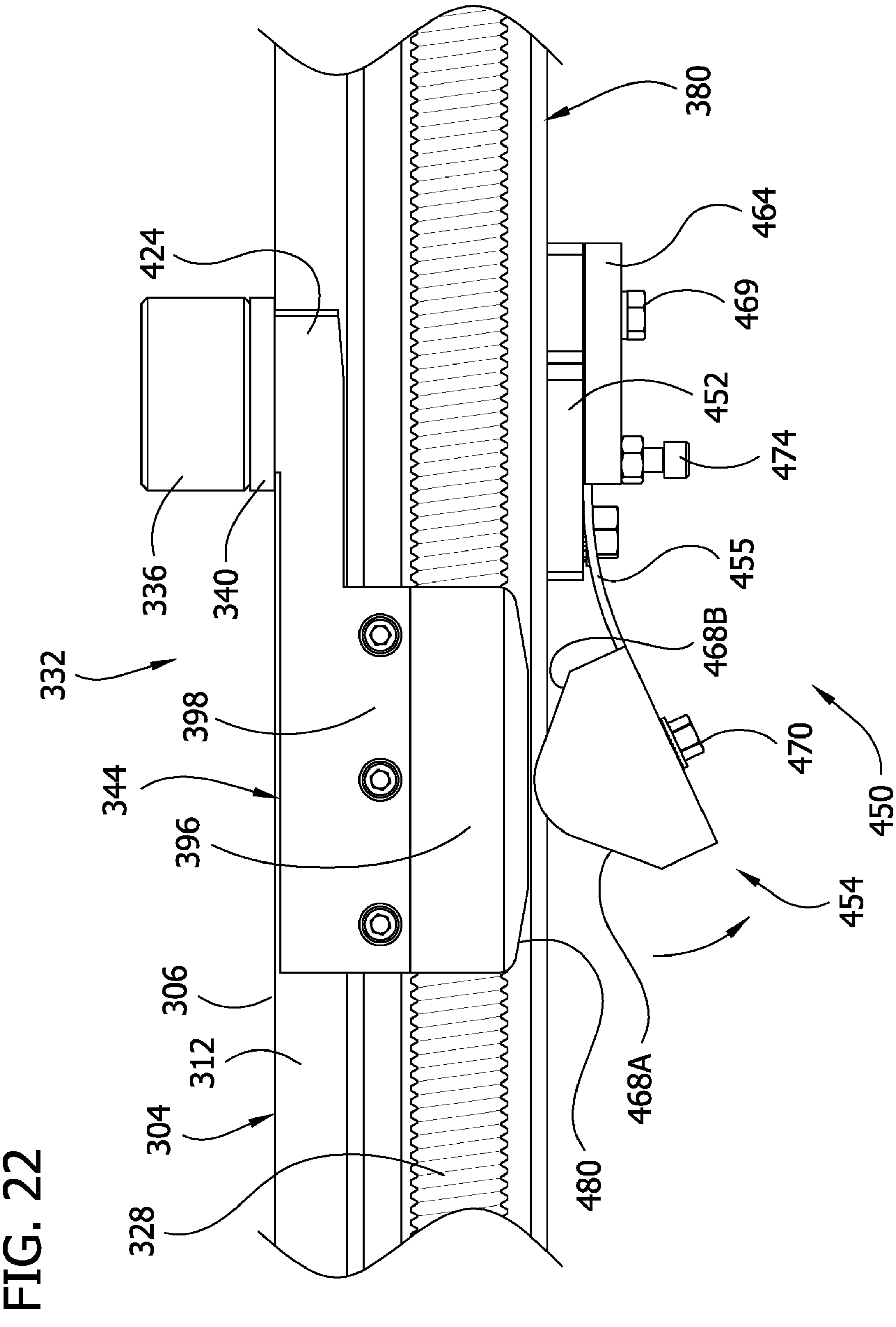
FIG. 22 is similar to FIG. 21 except that it shows the rod-supporting assembly being deflected downward as the puck carriage passes over the rod-supporting assembly.
Figure 23:
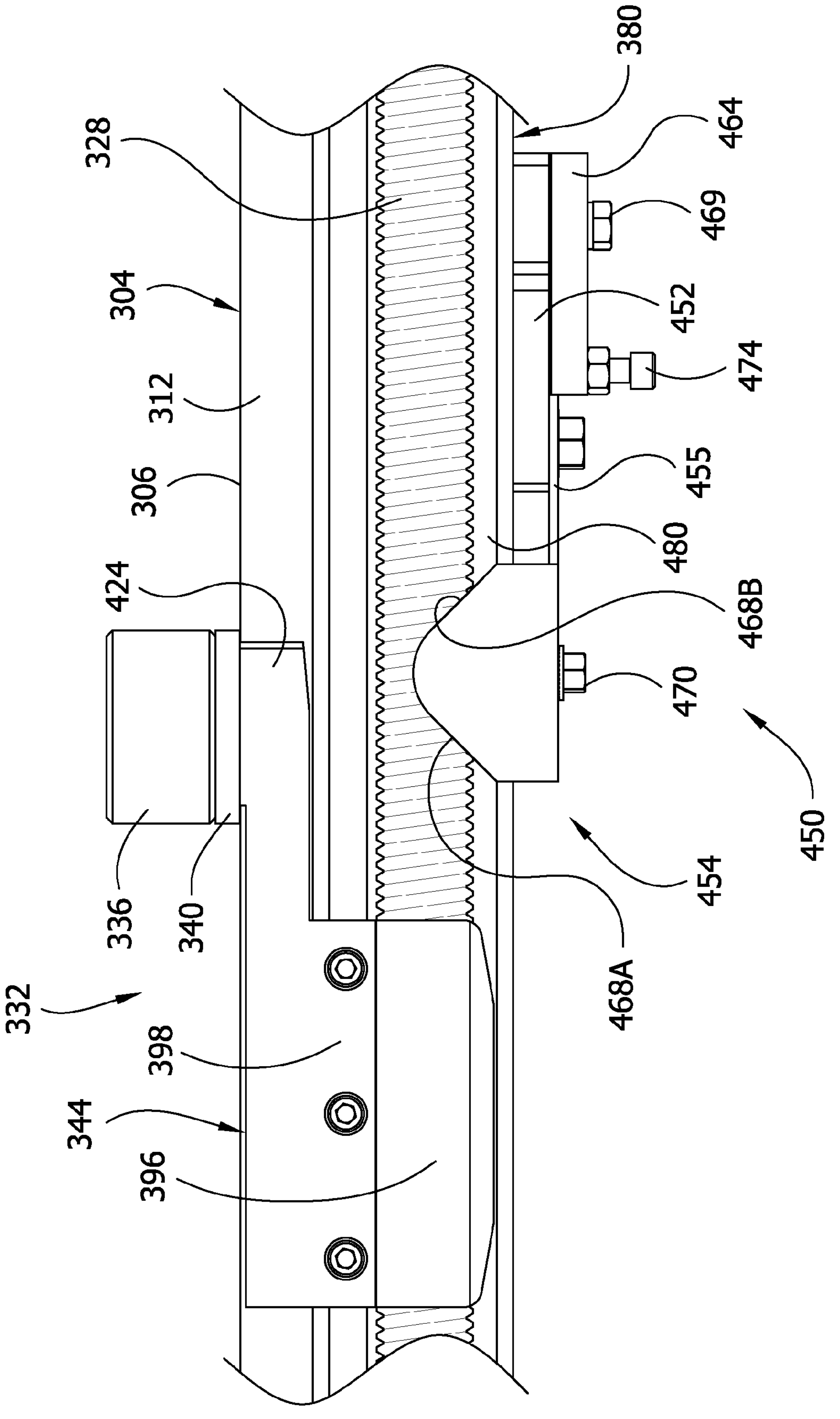
FIG. 23 is similar to FIG. 21 except that it shows the rod-supporting assembly and the puck assembly after the puck assembly has passed the rod-supporting assembly.

In addition to providing the upward force on the rod 328 to maintain the linearity of the rod, the resiliently flexible bar 455 allows the puck carriage 344 to move past the saddle block 454 as the puck carriage is moving longitudinally along the rod. Referring to FIGS. 21-23, a sequence of the puck carriage 344 passing the rod-supporting assembly 450 as the carriage is moving to the left along the rod 328 is illustrated. As will be appreciated by those skilled in the art, the sequence is substantially similar when the carriage 344 is moving to the right along the rod 328. In the position illustrated in FIG. 21, a beveled lead edge of the base 396 of the carriage 344 first contacts the sloped rear face 468B of the saddle block 454. Referring to FIG. 22, as the carriage 344 continues its movement, the force of the carriage deflects the cantilever bar 455 deflects so that the saddle block 454 moves downward. The upwardly sloping rear face 468B of the block 454 acts as ramp to allow a bottom surface 480 of the carriage base 396 to ride along the face of the block as the bar 455 continues to deflect and the block continues to move downward. The bottom surface 480 of the carriage base 396 slopes from each of the front and rear ends toward the center of the base to further facilitate engagement with the saddle block 454. After the puck carriage 344 moves past the saddle block (FIG. 23), the bar elastically rebounds and the saddle 454 moves upward, back to its original position of engagement with the rod 328. Accordingly, where each bar 328, 326 has two or more rod-supporting assemblies 450 associated with it, each rod is continuously supported and retained within at least one of the saddles, thus maintaining the linearity of the rod and prohibiting the rod from deflecting as it rotates.

Removable plank units 102, 202 may also be packaged in a truss assembly jigging table automated retrofitting kit. Such a kit includes one or more removable plank units 102, 202 and may include a plurality of fasteners for affixing removable plank units 102, 202 to a truss assembly jigging table, tools necessary for removing planks and inserting removable plank units 102, 202, cords for connecting removable plank units 102, 202 to a power system and a computer control system, and/or software to be installed on a computer control system. Removable plank units 102, 202 may come fully assembled, as shown in FIGS. 1-3, or may come disassembled so that the number, location, and configuration of the various components, such as drive motors, rods, and puck assemblies, can be varied upon assembly as required for a particular application.

Figure 24:
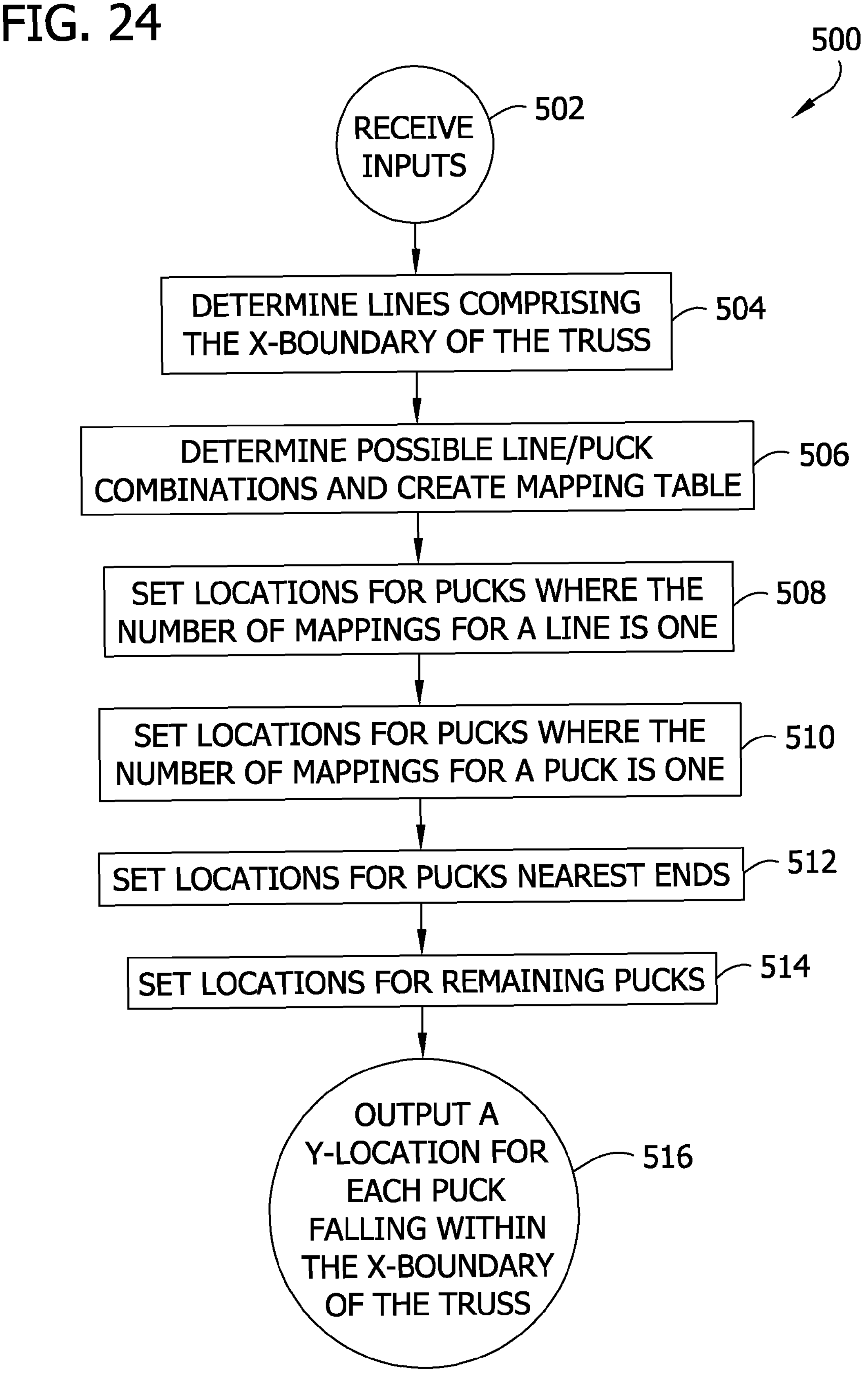
FIG. 24 is a flowchart of the steps taken during a puck placement optimization process run by a software system according to an embodiment of the present invention.

Truss assembly table 100, 200 need only be connected to a power system and a computer control system having software capable of positioning the pucks to create an automated truss assembly system. FIG. 24 depicts a puck placement optimization process 500 run by a software system that optimizes the placement of pucks around a truss to be assembled on a truss assembly table by employing an algorithm that selects whether each puck should be placed on the top or on the bottom of the perimeter of the truss. This optimizes the support given to the truss members by keeping the pucks as close as possible to the end of the truss members and minimizing the gaps between pucks. This results in quicker, more efficient, and more reliable truss assembly.

In the puck placement optimization process 500 of FIG. 24, the software system first receives the system inputs at step 502, which include a polygon representing each board in the truss and a line representing the full travel of each puck. The software system then determines a list of lines at step 504 that represent the outer edges of the boards, not including the board ends, which define the perimeter or x-boundary of the truss. For each puck, the software system then determines at step 506 whether the puck can be located tangent to each line and creates a mapping table which lists each possible puck-line combination, as well as whether the tangency is on the upper or lower perimeter of the truss. For each set of mappings for a line, if the number of mappings is only equal to one (meaning only one puck can be located tangent to that line) then that location is chosen for the puck at step 508. All other mappings for that puck are then removed from the table, as is the case any time a location is selected for a particular puck. Similarly, for each set of mappings for a puck, if the number of mappings is only equal to one (meaning that the puck can only be tangent to one line) then that location is chosen for the puck at step 510.

At step 512, the mapping that is the shortest distance to each end (point A and point B) of each line is selected. This ensures that pucks are located as near as possible to the ends of each truss member. At this point, all of the pucks that can be placed near the end of a line have been placed, and only pucks that would exist between two other pucks remain. For the pucks that have not yet been placed, the puck with a mapping the greatest distance from the previously placed puck located furthest from its respective point A is selected at step 514. This selection process is repeated for all remaining pucks, until a location is chosen for each puck. This ensures that the gaps between pucks are minimized. The system output 516 is then a y-location for each puck that falls within the x-boundary of the truss. The software system can then activate the drive assemblies of the truss assembly table to position the pucks in the selected locations. The software uses these coordinates to accurately position pucks even if there are inaccuracies in the tables and/or alignment of the jigging rails.

Figure 25:
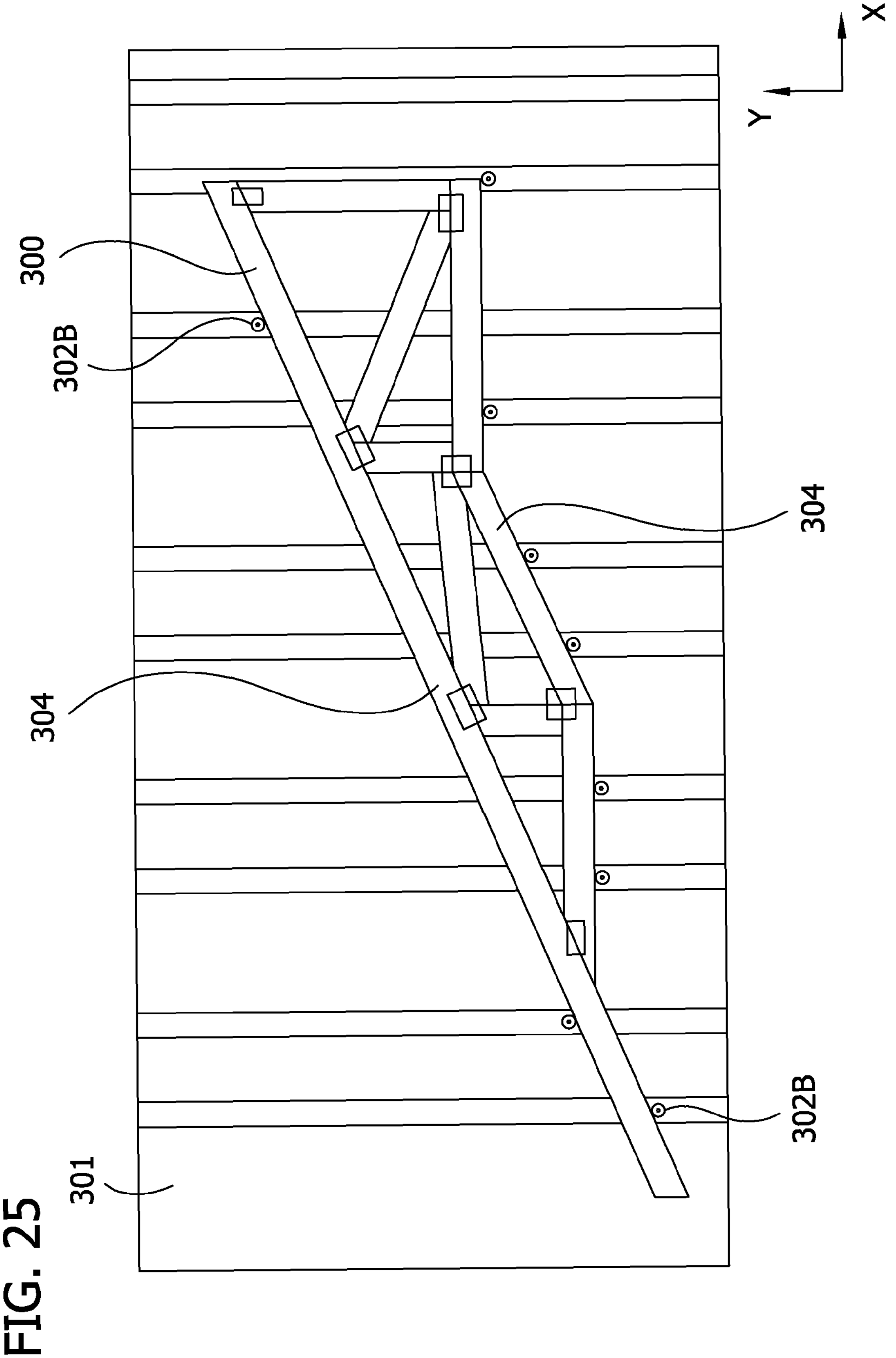
FIG. 25 is a truss assembly table with a truss having optimized puck placement according to an embodiment of the present invention.
Figure 26:
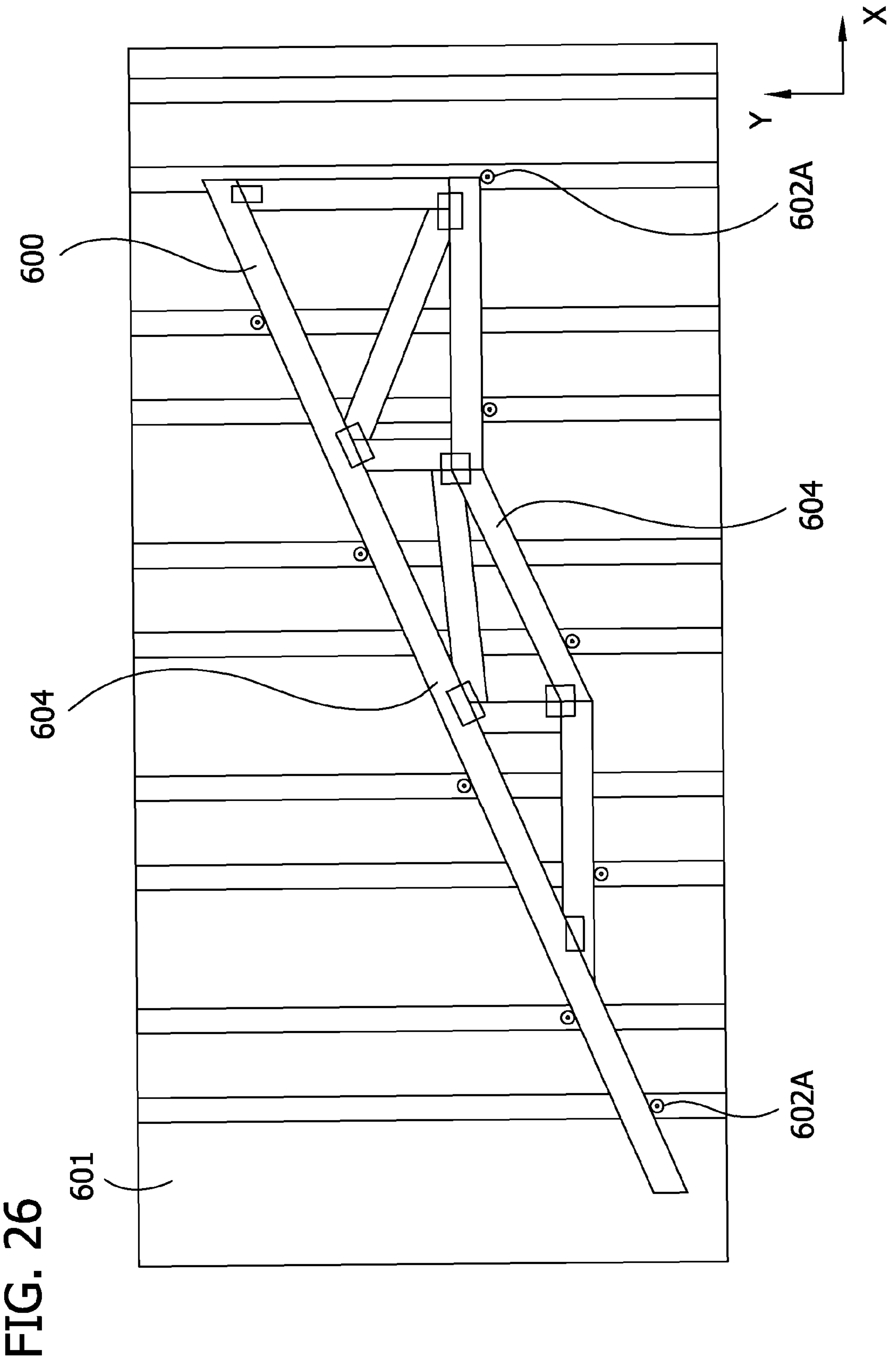
FIG. 26 is the truss of FIG. 25 without optimized puck placement.

FIG. 25 depicts a truss assembly table 301 with a truss 300 having pucks 302B placed with the optimization process 500 of FIG. 24, and FIG. 26 depicts a truss assembly table 601 with a truss 600 having pucks 602A placed in a typical manner of alternating pucks between the upper and lower perimeter of the truss. As can be seen in the figures, the optimized pucks 302B provide better support to the truss members 304 because they are located closer to the ends of the truss members and the gaps between pucks 302B are minimized. The non-optimized pucks 602A do not provide as good of support, because they are spread further apart and because many of the truss members 604 only have one puck 602A helping to hold them in place. The superior truss member support provided by the optimally placed pucks 302B in FIG. 25 will lead to faster, more efficient, and more reliable truss assembly. Although the puck optimization process 500 is described with reference to one particular truss assembly system, one of ordinary skill in the art will recognize that it can be adapted for use with any known truss assembly system.

Figure 27:
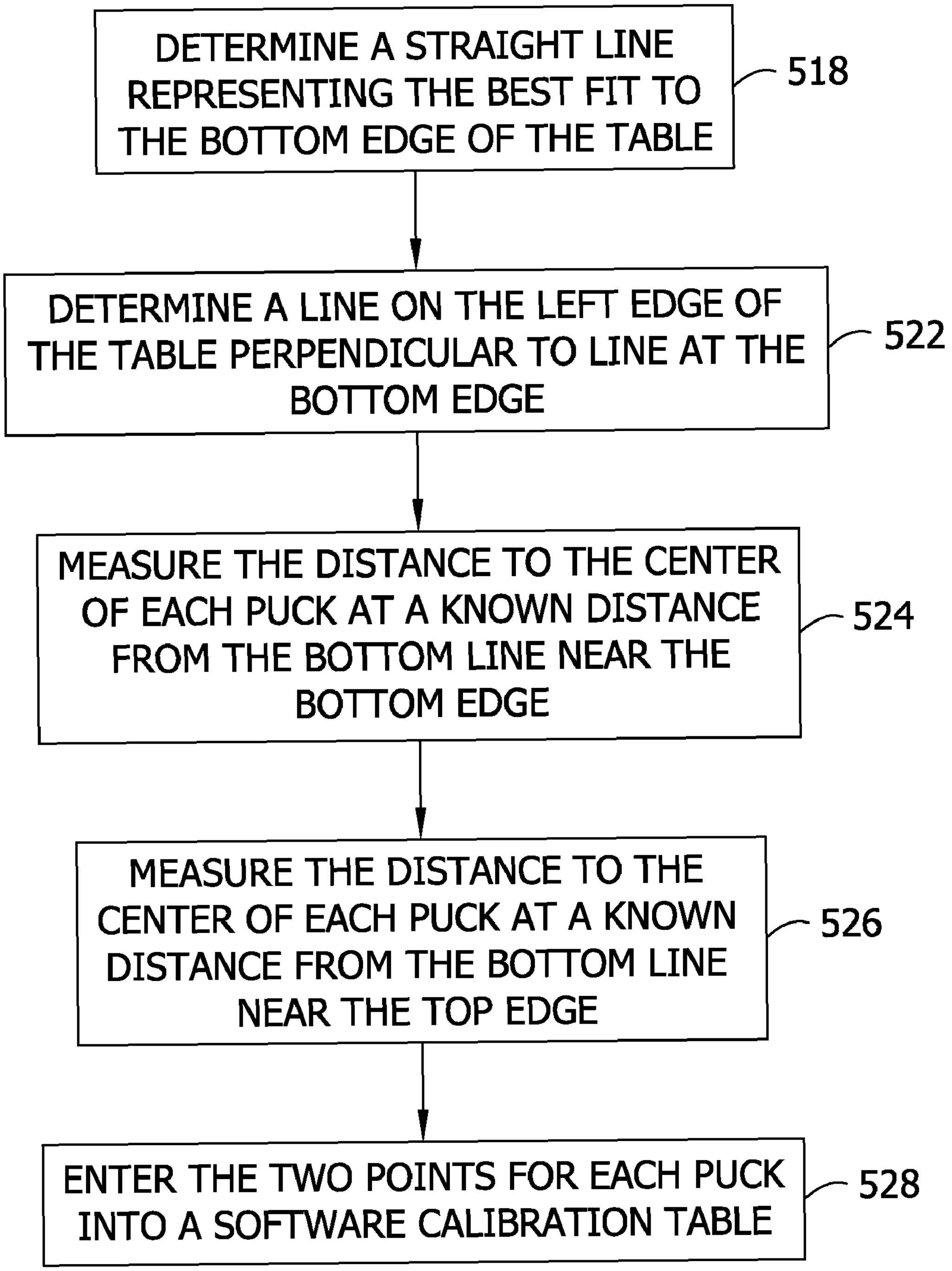
FIG. 27 is a flowchart of the steps taken during a rail calibration process run by a software system according to an embodiment of the present invention.

In one embodiment of the present invention, the software system is programmed to calibrate the location of each rail along which the pucks slide on the table rather than relying on mechanical alignment of the rails to the truss table. One embodiment of an algorithm for calibrating the location of each rail is depicted schematically in FIG. 27. Referring to FIG. 27, at step 518 a ("first") straight line representing the best fit to the bottom edge of the table is determined. This line can preferably be laid out with a string line or a laser. A ("second") straight line on the left edge of the table that is perpendicular to the straight line on the bottom edge of the table is then determined at step 522. In this embodiment, the first and second straight lines comprise input regarding the geometry of the table. The ("first") distance from this left line to the center of each puck at a known, fixed distance from the bottom line (e.g., 10 inches) near the bottom edge of the table is then measured at step 524. Next, at step 526, the ("second") distance from the left line to the center of each puck is measured at a known, fixed distance from the bottom line (e.g., 155 inches) near the top edge of the table. These two points for each puck are then entered into a software calibration table at step 528. The software system can then calibrate the line of travel for each puck based on these entries. This feature allows software system to compensate for any inaccuracies in table placement, and the table itself. For example, the calibration feature compensates for inaccuracies due to adjacent planks being non-parallel. The calibration features simplifies and lowers the cost of the table and installation because, for example, it is not essential that adjacent planks be substantially parallel in order for the puck placement to be accurate.

The software system can also automatically select the placement of interior pucks for attic trusses. The puck location selection process 500 is the same as that described in FIG. 24, with the addition of lines representing the interior truss rails that comprise the top of the attic and the bottom of the attic to the system inputs. A user of the software system can also manually select pucks to be positioned on the interior of a truss. Known locations where pucks can be placed on the interior of a truss can be entered into the software system as an additional input. Puck locations can then be changed by a user by dragging pucks on a user interface of the computer system of the truss assembly system from a previously selected exterior location near an inner location. The puck can then "snap" to the closest location out of the possible interior placement points. When the software system actuates the drive assemblies to set the pucks, the relocated pucks will be set in their newly selected positions.

Figure 28:
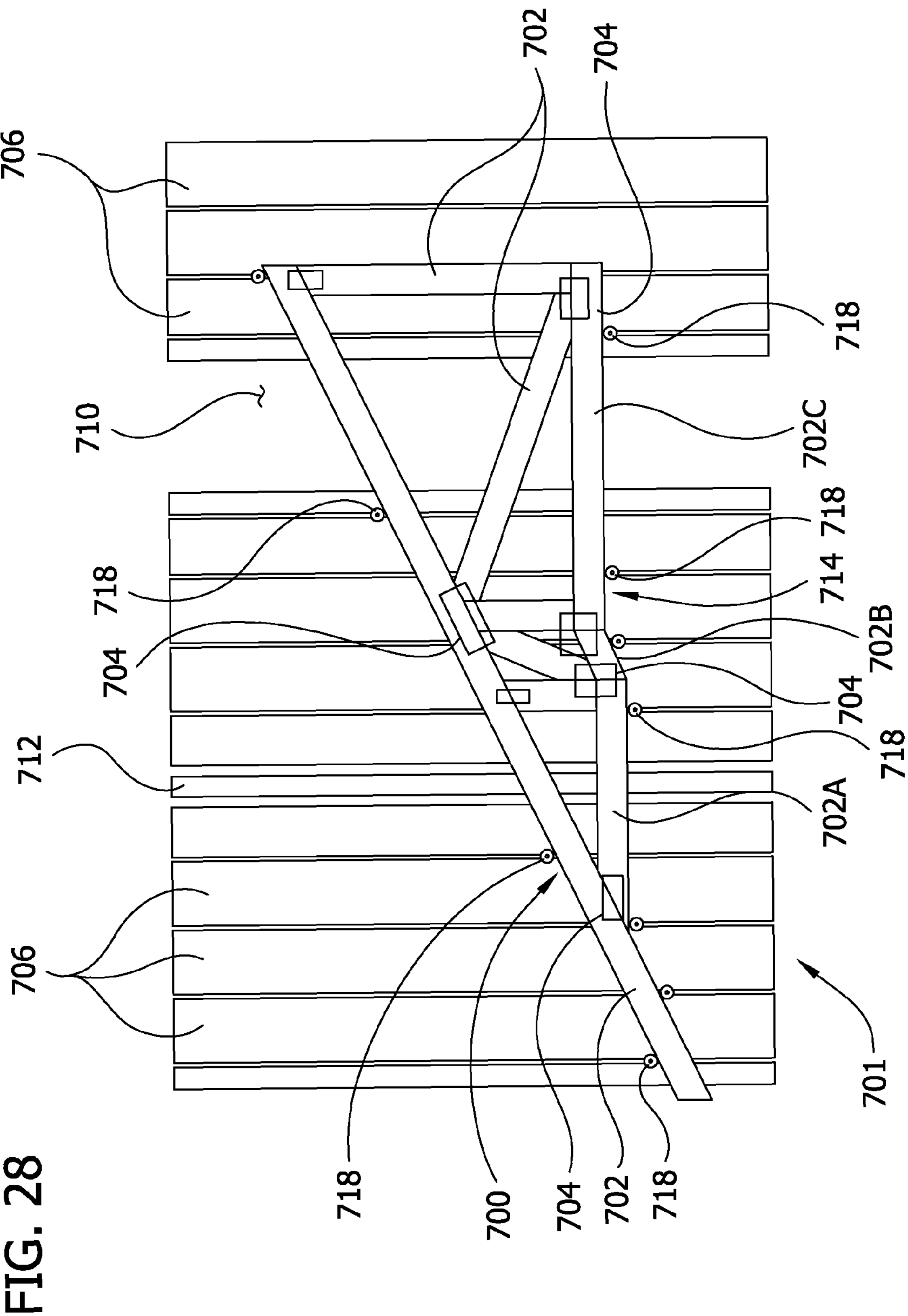
FIG. 28 is a top plan view of a truss assembly table with a truss arranged on the table in an optimized placement position.
Figure 29:
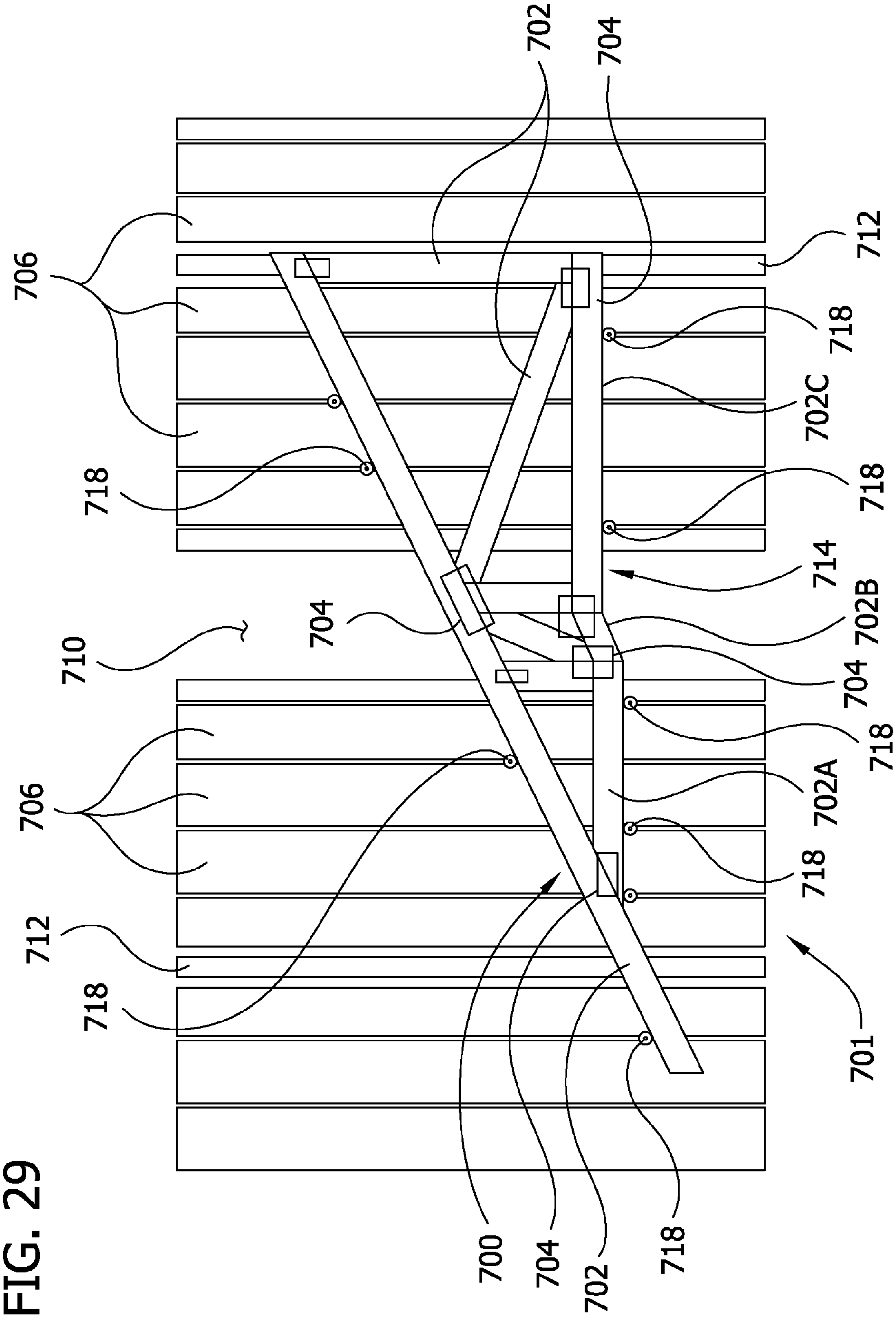
FIG. 29 is similar to FIG. 28 except that the truss is arranged in a non-optimized placement position.
Figure 30:
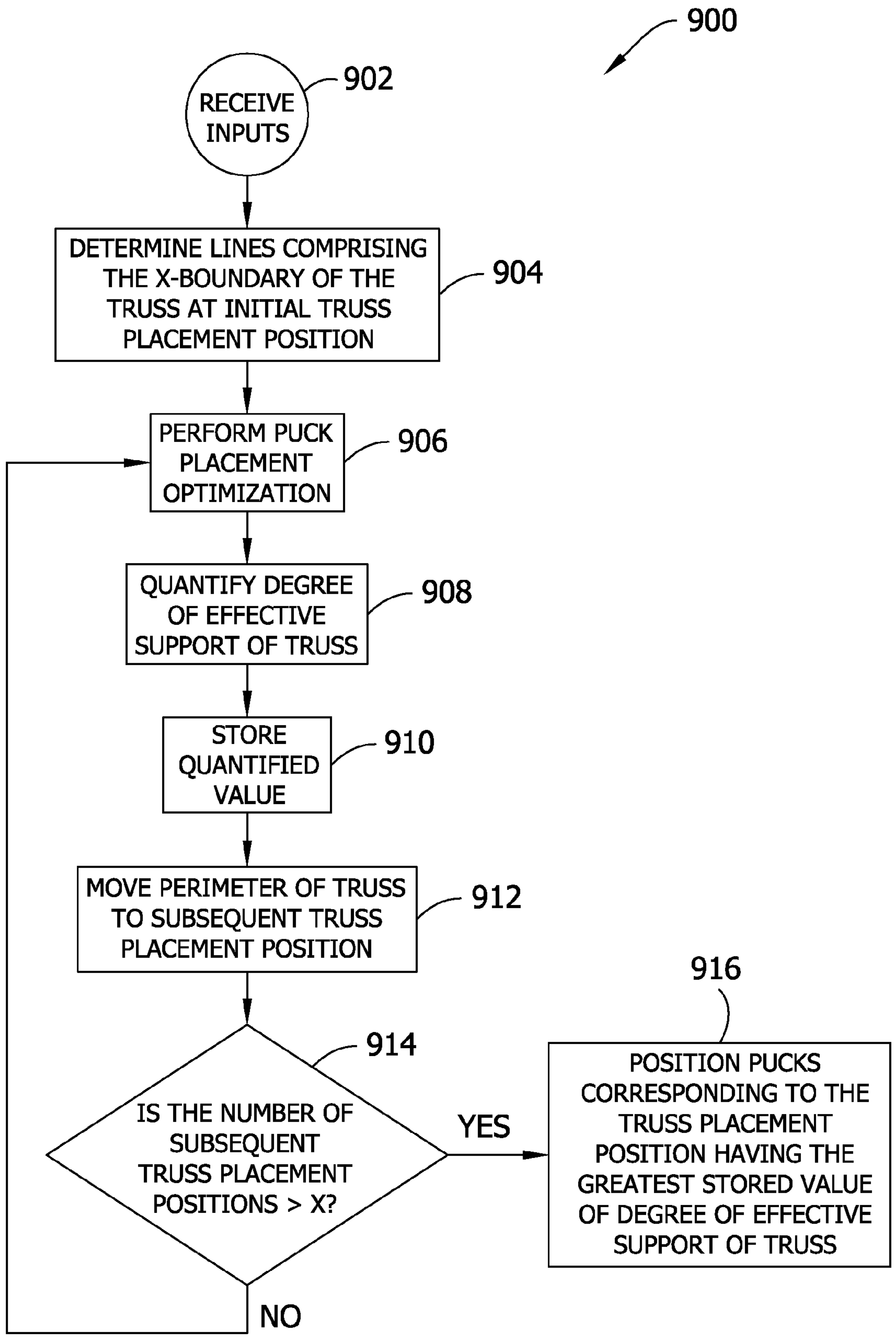
FIG. 30 is a flowchart of the steps taken during a truss placement optimization process run by a software system according to an embodiment of the present invention.

Referring to FIGS. 28-30, the software system may perform a truss placement optimization process. It is understood that the software system preferably also performs the puck placement optimization process outlined above, as will be explained below. The truss placement optimization process operates to determine the best placement and/or orientation of the truss on the table. For example, the truss placement optimization process accounts for the ejectors and walkways of a truss table and situates the truss so the joints of the respective structural components where the connector plates are secured are situated over the table surface rather than walkways or ejectors. As an example, the placement of a truss 700 in FIG. 28 allows for the best support of the truss on the table 701 as compared to the placement of the same truss on the same table in FIG. 29. In FIG. 28, all of the joints of the structural components 702 that are to be secured together by connector plates (which are represented schematically at reference numeral 704) overlie table surface 706 (defined by the upper surfaces of the planks), whereas in FIG. 29, some of the joints of the structural components 702 are disposed over a walkway 710 and an ejector 712. Moreover, the bottom chord, generally indicated at 714, of the truss 700 includes three members 702A, 702B, 702C, and in FIG. 28, all three members are properly supported by respective pucks 718, whereas in FIG. 29, the middle chord 702B is not supported by the pucks.

In another example, the truss placement optimization process may account for the height of the truss so that, for example, if the height of the truss is greater than the width of the table (i.e., the lengths of the planks), the truss may be rotated so that the height of the truss is along or parallel to the length of the table. In yet another example, the truss placement process may account for the spacing of the pucks along the length of the table, particularly if the spacing of the pucks is not uniform, so that certain portions of the truss, such as pitch breaks, may be properly located on the table to optimally support the truss.

In one embodiment, the truss placement optimization process comprises an algorithm carried out by the software system. In one exemplary process, indicated generally at 900 in the flowchart of FIG. 30, the software system receives the system inputs at step 902, which include a polygon representing each board in the truss and a line representing the full travel of each puck. The software system then determines a list of lines at step 904 that represent the outer edges of the boards, not including the board ends, which define the perimeter of the truss at an initial truss placement position on the table. With the perimeter of the truss at this initial placement position on the table, the software system then performs the puck placement optimization process at step 906, such as by using the algorithm detailed above. The software system then quantifies the degree of effective support of the truss at this location on the table at step 908 by determining, for example, whether any of the joints of the structural components are overlying an open walkway or an ejector, and/or whether the pucks are effectively supporting each of the structural components, and/or other factors that are indicative of the degree to which the truss would be supported by the pucks. The value representing the degree of effective support is stored at step 910.

After determining the degree of effective support at the initial position, at step 912, the software system then moves the perimeter of the truss along the length of the table a selected distance, such as about 2.54 cm (1 in) to about 7.62 cm (3 in), to a second placement location on the table. The steps of performing the puck placement optimization process, determining the effectiveness of the puck supports, and recorded the effectiveness as a quantity are repeated for the second placement position. After performing the steps for the second placement position, the perimeter of the truss is moved to a third placement position. After repeating each of the above steps for a predetermined number times at step 914 and/or after it is determined by the software system that the placement positions are effectively being repeated, the software system, at step 916, compares the quantified values of the effectiveness of the support by the pucks at the different truss placement positions and selects the placement position that has the optimal support for the truss. The pucks are moved to their optimal positions for the selected truss placement position. It is understood that other ways of determining the optimal truss placement on the truss table is within the scope of the present invention.

Removable board segments 202 and software system may be most advantageously used with a truss assembly system that utilizes a laser projection system, such as the embodiment illustrated in FIG. 7. Such a truss assembly system projects a laser image of a desired truss in actual shape and size on the work surface, which ensures greater accuracy in truss assembly. Retrofitting the automated system to a system with laser projection system, rather than one with a standard table, provides a check on the automated system and software system such that an operator can easily tell whether they are functioning accurately and reliably.

As may be apparent from the above description of the illustrated embodiment, an advantage of the preferred embodiment is increased reliability and efficiency of truss assembly. The software system keeps the pucks as close as possible to the ends of the truss members that are assembled into a truss and minimizes the gaps between pucks. This provides optimum support to the truss members as they are laid out on the truss assembly table. Optimally supported truss members stay in place better as they are being assembled, which allows for more efficient and consistent assembly.

Another an advantage of the preferred embodiment is increased efficiency and cost savings. Removable plank units allow a manual truss assembly jig setting table to be quickly converted into an automated table. This increases the speed and efficiency of truss assembly. In addition, a significant capital expenditure is saved by converting the old tables into automated tables, rather than having to throw out the old tables and purchase completely new ones.

Yet another advantage of the illustrated embodiment is flexibility. Because of the removable nature of removable plank units, varying numbers of such segments may be used at any one time. The width of segments and the distance between segments may also be varied. This allows different numbers and configurations of puck assemblies to be used depending on the requirements of a particular truss.

When introducing elements of the present invention or the preferred embodiment(s) thereof, the articles “a”, “an”, “the” and “said” are intended to mean that there are one or more of the elements. The terms “comprising”, “including” and “having” are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of automatically placing pucks on a truss assembly table, the method comprising the steps of:

receiving input regarding the geometry of the truss assembly table that is used to compensate for any inaccuracies in table placement and the table itself and input regarding a truss to be assembled on the truss assembly table, wherein the input received regarding the truss assembly table comprises a line representing the full range of travel of each puck based on line representations of a bottom edge and adjacent side edge of the truss assembly table;

processing the inputs;

selecting locations on the truss assembly table for each puck based on the processed inputs; and automatically moving the pucks to their selected locations.

2. The method of automatically placing pucks on a truss assembly table of claim 1, wherein the inputs received comprise a representation of a polygon representing each board in a truss.

3. The method of automatically placing pucks on a truss assembly table of claim 2, wherein the is inputs are processed by the steps of:

determining a list of lines that represent the outer edges of truss members that are assembled into the truss;

for each puck, determining if the puck can be located tangent to each line; and creating a mapping of each possible puck-line tangency.

4. The method of automatically placing pucks on a truss assembly table of claim 3, where the locations for each puck are selected by:

selecting as a location for a puck any location where only one puck can be located tangent to a line;

selecting as a location for a puck any location where a puck can be located tangent to only one line;

selecting as a location for a puck the puck location that is the shortest distance to one end of each line;

selecting as a location for a puck the puck location that is the shortest distance to the other end of each line; and selecting puck locations for all remaining pucks as far apart as possible from all previously selected puck locations.

5. The method of automatically placing pucks on a truss assembly table of claim 1, in combination with a method of calibrating the location of each rail on the truss assembly table.

6. The method of automatically placing pucks on a truss assembly table of claim 5, wherein the method of calibrating the location of each rail comprises the steps of:

determining a first straight line representing a best fit to a first edge of the truss assembly table;

determining a second straight line on a second edge of the truss assembly table that is perpendicular to the first edge;

measuring a first distance from the second straight line to the center of each puck at a known fixed distance from the first straight line near the first edge;

measuring a second distance from the second straight line to the center of each puck at a known fixed distance from the first straight line near a third edge of the truss assembly table opposite of the first edge; and recording the first distance and the second distance for each puck.

7. The method of automatically placing pucks on a truss assembly table of claim 6, wherein the straight line representing the best fit to the first edge of the truss assembly table is laid out with a string line.

8. The method of automatically placing pucks on a truss assembly table of claim 6, wherein the straight line representing the best fit to the first edge of the truss assembly table is laid out with a laser.

9. The method of automatically placing pucks of a truss assembly table of claim 4, wherein the inputs comprising a representation of a polygon representing each board in a truss includes boards located both on the interior and the exterior of the truss.

10. The method of automatically placing pucks of a truss assembly table of claim 4, further comprising the steps of:

receiving a list of locations on the interior of the truss that pucks can be located;

receiving a request to change a puck location for a puck with a selected puck location on an exterior of the truss to one of the locations on an interior of the truss; and changing the selected puck location for the puck.

11. A truss assembly table comprising:

a table;

a plurality of puck assemblies mounted for translational movement on the table; and a software system operatively connected to the table that controls the movement of the puck assemblies, wherein the software system chooses whether each puck assembly should be located on a top side, bottom side, or interior of a truss to be assembled on the table based on a determined geometric condition of each puck, individual truss members, and the truss to be assembled in order to provide optimum support for each individual truss member and the truss while it is being assembled, wherein the software system is configured to determine a location for each puck assembly based on at least one of minimizing gaps between puck assemblies and placing the puck assemblies closer to ends of the truss members.

12. The truss assembly table of claim 11, further comprising a laser projection system configured to project a laser image onto the table.

13. The truss assembly table of claim 12, wherein the laser image displays the location of truss members.

14. The truss assembly table of claim 11, wherein the table comprises a table frame and plurality of board segments, and wherein at least one board segment comprises:

a plank to which a puck assembly is operatively connected; and a drive assembly arranged to move the puck assembly lengthwise along the plank.

15. The truss assembly table of claim 14, wherein the drive assembly is controlled by the software system.

16. The truss assembly table of claim 14, wherein the drive assembly includes a motor and a screw.

17. The truss assembly table of claim 11, wherein the software system chooses a placement of each puck assembly to provide optimum support for the truss by placing each puck assembly as close as possible to an end of a truss member.

18. The truss assembly table of claim 11, wherein the software program chooses a placement of each puck assembly to provide optimum support for the truss by minimizing a gap between each of the plurality of puck assemblies.

19. A method of assembling the components of a truss, the method comprising the steps of:

entering a design of a truss into a computer system that controls the movement of puck assemblies on a truss assembly table;

running a software program on the computer system that chooses whether each puck assembly should be located on a top side, bottom side, or interior of the truss based on a determined geometric condition of each puck, individual truss members, and the truss to be assembled in order to provide optimum support for each individual truss member and the truss while it is being assembled and moves each puck assembly to its chosen location, wherein the software system chooses a location for each puck assembly based on at least one of minimizing gaps between puck assemblies and placing the puck assemblies closer to ends of the truss members;

placing the truss members on the truss assembly table according to the puck assembly locations; and assembling the truss members to form a truss.

20. The method of assembling the components of a truss of claim 19, wherein the computer system further controls at least one laser projector which can project an image of the truss onto the truss assembly table.

21. The method of assembling the components of a truss of claim 20, further comprising the step of aligning the truss members with the image of the truss.

22. A method of calibrating location of each rail on a truss assembly table comprising the steps of:

determining, by a computer control system, a first straight line representing a best fit to a first edge of the truss assembly table;

determining, by the computer control system, a second straight line on a second edge of the truss assembly table that is perpendicular to the first edge;

measuring, by the computer control system, a first distance from the second straight line to the center of each puck at a known fixed distance from the first straight line near the first edge;

measuring, by the computer control system, a second distance from the second straight line to the center of each puck at a known fixed distance from the first straight line near a third edge of the truss assembly table opposite of the first edge; and recording, by the computer control system, the first distance and the second distance for each puck.

23. The method of calibrating location of each rail on a truss assembly table of claim 22, wherein the straight line representing the best fit to the first edge of the truss assembly table is laid out with a string line.

24. The method of calibrating location of each rail on a truss assembly table of claim 22, wherein the straight line representing the best fit to the first edge of the truss assembly table is laid out with a laser.

* * * * *